United States Patent
Yabumoto

(10) Patent No.: US 11,624,863 B2
(45) Date of Patent: Apr. 11, 2023

(54) DIFFRACTIVE OPTICAL ELEMENT, OPTICAL SYSTEM, OPTICAL APPARATUS AND METHOD FOR PRODUCING DIFFRACTIVE OPTICAL ELEMENT

(71) Applicant: Nikon Corporation, Tokyo (JP)

(72) Inventor: Hiroshi Yabumoto, Yokohama (JP)

(73) Assignee: Nikon Corporation, Tokyo (JP)

(*) Notice: Subject to any disclaimer, the term of this patent is extended or adjusted under 35 U.S.C. 154(b) by 379 days.

(21) Appl. No.: 16/960,886

(22) PCT Filed: Dec. 27, 2018

(86) PCT No.: PCT/JP2018/048040
§ 371 (c)(1),
(2) Date: Jul. 9, 2020

(87) PCT Pub. No.: WO2019/142641
PCT Pub. Date: Jul. 25, 2019

(65) Prior Publication Data
US 2020/0333515 A1    Oct. 22, 2020

(30) Foreign Application Priority Data
Jan. 16, 2018   (JP) .............................. JP2018-004766

(51) Int. Cl.
G02B 5/18    (2006.01)
G02B 9/04    (2006.01)
G02B 27/00   (2006.01)

(52) U.S. Cl.
CPC ............. G02B 5/1866 (2013.01); G02B 9/04 (2013.01); G02B 27/0056 (2013.01)

(58) Field of Classification Search
CPC ..... G02B 5/1866; G02B 9/04; G02B 27/0056
(Continued)

(56) References Cited

U.S. PATENT DOCUMENTS

| 2002/0105726 A1 | 8/2002 | Okuna et al. |
| 2012/0050868 A1* | 3/2012 | Takayama .......... G02B 27/4288 359/566 |
| 2013/0141790 A1 | 6/2013 | Shimizu et al. |

FOREIGN PATENT DOCUMENTS

| JP | 2002-082214 A | 3/2002 |
| JP | 2012-048081 A | 3/2012 |

(Continued)

OTHER PUBLICATIONS

International Search Report from International Patent Application No. PCT/JP2018/048040, dated Apr. 9, 2019.
(Continued)

*Primary Examiner* — Marin Pichler
*Assistant Examiner* — Mitchell T Oestreich
(74) *Attorney, Agent, or Firm* — SGPatents PLLC

(57) ABSTRACT

There are provided an excellent diffractive optical element having a small amount of flare coloring and unaffected optical performance with a decrease in diffraction efficiency minimized and an optical system and an optical apparatus using the diffractive optical element. A diffractive optical element GD used in an optical system OL of a camera 1, which is an optical apparatus, and including a diffraction grating so that the diffractive optical element GD serves as a lens is so configured that the grating height h0 of the diffraction grating in a central region Ac around an optical axis Z is smaller than the grating height hmax of the diffraction grating in a peripheral region Ap.

13 Claims, 20 Drawing Sheets

(58) Field of Classification Search
USPC .......................................................... 359/566
See application file for complete search history.

(56) References Cited

FOREIGN PATENT DOCUMENTS

| | | |
|---|---|---|
| JP | 2015-172711 A | 10/2015 |
| JP | 2016-173439 A | 9/2016 |
| WO | WO 2012/114408 A1 | 8/2012 |

OTHER PUBLICATIONS

Written Opinion of the International Searching Authority from International Patent Application No. PCT/JP2018/048040, dated Apr. 9, 2019.
Office Action dated Aug. 25, 2021, in Chinese Patent Application No. 201880086437.8.
Office Action dated Jun. 22, 2021, in Japanese Patent Application No. 2019-566395.
English Translation of International Preliminary Report on Patentability (including Written Opinion of the ISA) from International Patent Application No. PCT/JP2018/048040, dated Jul. 30, 2020.

* cited by examiner (a)

(c)

(b)

(d)

(a)

(c)

(b)

(d)

DIFFRACTIVE OPTICAL ELEMENT, OPTICAL SYSTEM, OPTICAL APPARATUS AND METHOD FOR PRODUCING DIFFRACTIVE OPTICAL ELEMENT

TECHNICAL FIELD

The present invention relates to a diffractive optical element, an optical system, an optical apparatus, and a method for producing the diffractive optical element.

BACKGROUND ART

As a related-art lens type preferable for a long-focal-length imaging optical system, there is an optical system including a first lens group having positive refracting power and a second lens group having negative refracting power with the two lens groups sequentially arranged from the object side, what is called a telescopic lens, and there is a disclosed method for reducing chromatic aberrations in the optical system by using a diffractive optical element with a diffraction grating having a diffraction effect provided at a surface of any of the lenses or in part of the optical system (see Patent Literature 1, for example). Patent Literature 1, however, has a problem, that is, the optical performance of the diffractive optical element is required to be further improved.

CITATION LIST

Patent Literature

Patent Literature 1: Japanese Patent Laid-Open No. 2016-173439

SUMMARY OF INVENTION

A diffractive optical element according to a first aspect of the present invention is a diffractive optical element including a diffraction grating so that the diffractive optical element serves as a lens, and a grating height of the diffraction grating in a central region around an optical axis is smaller than the grating height of the diffraction grating in a peripheral region.

A diffractive optical element according to a second aspect of the present invention is a diffractive optical element including a blazed diffraction grating so that the diffractive optical element serves as a lens. The diffractive optical element has at least two regions that provide different diffraction efficiencies on a wavelength basis. The at least two regions have a central region that is a region around an optical axis and having a radius smaller than a predetermined normalized radius and a peripheral region that has a radius greater than the predetermined normalized radius. Conditions below are satisfied:

$0.50 < rs < 0.98;$ $E\_in < E\_out;$ $E\_in > 90\%;$ and $E\_out > 90\%,$ where
rs: The predetermined normalized radius (quotient resulting from operation of dividing height from optical axis in direction perpendicular to optical axis by effective diameter), E_in: Diffraction efficiency of the diffraction grating in the central region at a C line, and E_out: Diffraction efficiency of the diffraction grating in the peripheral region at the C line.

A diffractive optical element according to a third aspect of the present invention is a diffractive optical element including a blazed diffraction grating so that the diffractive optical element serves as a lens. The diffractive optical element has at least two regions that provide different diffraction efficiencies on a wavelength basis. The at least two regions have a central region that is a region around an optical axis and having a radius smaller than a predetermined normalized radius and a peripheral region that has a radius greater than the predetermined normalized radius. Conditions below are satisfied:

$0.50 < ra < 0.98;$ and $W\_in < W\_out;$ $5 \text{ nm} < W\_out - W\_in < 50 \text{ nm},$ where
ra: The predetermined normalized radius (quotient resulting from operation of dividing height from optical axis in direction perpendicular to optical axis by effective diameter), W_in: Wavelength at which the diffraction efficiency is maximized in the diffraction grating in the central region, and W_out: Wavelength at which the diffraction efficiency is maximized in the diffraction grating in the peripheral region.

A method for producing the diffractive optical element according to the first aspect of the present invention is a method for producing a diffractive optical element including a diffraction grating so that the diffractive optical element serves as a lens, the method including forming the diffraction grating in such a way that a grating height of the diffraction grating in a central region around an optical axis is smaller than the grating height of the diffraction grating in a peripheral region.

BRIEF DESCRIPTION OF DRAWINGS

FIG. 7(a) shows the spot image provided that rc=0.97. FIG. 7(b) diagrammatically shows the boundaries of the spot image in FIG. 7(a). FIG. 7(c) shows the spot image provided that rc=1.00. FIG. 7(d) diagrammatically shows the boundaries of the spot image in FIG. 7(c).

FIG. 8(a) shows the spot image provided that rc=0.93. FIG. 8(b) diagrammatically shows the boundaries of the spot image in FIG. 8(a). FIG. 8(c) shows the spot image provided that rc=1.00. FIG. 8(d) diagrammatically shows the boundaries of the spot image in FIG. 8(c).

DESCRIPTION OF EMBODIMENTS

Figure 1:
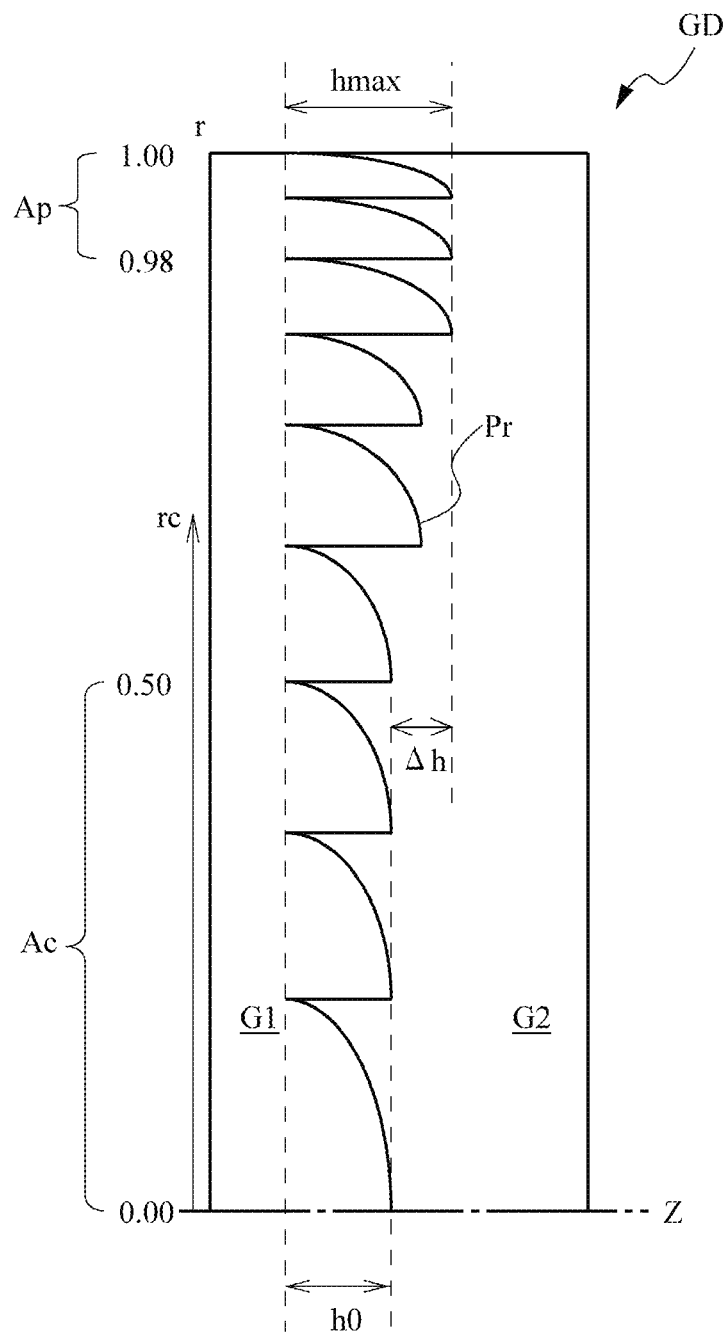
FIG. 1 is a diagrammatic view showing a cross section of a diffractive optical element according to a first embodiment.

Preferable embodiments will be described below with reference to the drawings.

A diffractive optical element is an optical element so produced as to have a slit-shaped, step-shaped, or sawtooth-shaped (blazed) grating structure formed of several slits, steps, or sawteeth (blazes) arranged in each minute gap (1 mm) at specific intervals, and the diffractive optical element is characterized in that it causes the light incident thereon to be diffracted in directions determined by the interval (gap) between the slits or blazes and the wavelength of the light. Such a diffractive optical element is used in a variety of optical systems and is known in recent years, for example, as an element used as a lens to collect diffracted light having a specific order into a spot.

Using such a diffractive optical element allows a telescopic optical system (telescopic lens) that corrects a variety of aberrations, such as chromatic aberrations, in a satisfactory manner, has a small telescopic ratio (short total lens length), and has high optical performance. As for the longitudinal chromatic aberration, in particular, the diffractive optical element allows apochromatic correction in which the diffractive optical element is used to correct the longitudinal chromatic aberration based on three wavelengths, unlike typical achromat correction in which the longitudinal chromatic aberration is corrected based on two wavelengths.

Light rays incident on the diffractive optical surface of the diffractive optical element are divided into diffracted light rays having a plurality of orders. In general, the grating structure of a diffractive optical element is so determined that a light flux that belongs to a wavelength region in use primarily has a specific order (hereinafter referred to as "design order") and the diffraction efficiency of the diffracted light having the design order is optimized at a design wavelength ($\lambda 0$). However, since the diffraction efficiency of the diffracted light depends on the wavelength, the diffraction efficiency at the design wavelength ($\lambda 0$) and wavelengths in the vicinity thereof is maximized, and the diffraction efficiency lowers as the discrepancy from the design wavelength ($\lambda 0$) increases. Therefore, in a case where the wavelengths of the light rays in use spread across a wide band, diffracted light rays having orders excluding the design order (hereinafter referred to as "unwanted diffracted light") each have a certain strength at wavelengths other than the design wavelength ($\lambda 0$) and wavelengths in the vicinity thereof. The design order refers to the diffraction order of diffracted light rays having maximum intensity out of the diffracted light rays diffracted by the diffraction grating and having diffraction orders of the order n, the orders (n±1), the orders (n±2), . . . .

In the case of a telescopic lens using a diffractive optical element, the optical system is so designed that the longitudinal chromatic aberration is corrected in correspondence with the diffracted light having the design order. However, the positions where the unwanted diffracted light rays are focused differ from the position where the diffracted light rays having the design order, and unwanted diffracted light having a longer wavelength undesirably forms flare light having a larger spot diameter on an imaging surface because the longitudinal chromatic aberration is not corrected (hereinafter color discrepancy that occurs because the spot diameter of the flare light varies on a wavelength basis is referred to as flare coloring).

FIG. 1 shows an intimate-contact-multilayer diffractive optical element GD, which is formed of a first diffractive optical member G1 made of a first optical material characterized by low refraction and high dispersion and a second diffractive optical member G2 made of a second optical material characterized by high refraction and low dispersion and in which a blazed structure Pr (relief pattern), which forms a blazed (sawtooth-shaped) diffraction grating, is provided between the first diffractive optical member G1 and the second diffractive optical member G2 with the blazed structure Pr being in intimate contact with the two diffractive optical members. FIG. 1 shows a case where the diffraction grating (blazed structure) is formed along a flat surface for ease of the description, and the diffraction grating (blazed structure) may instead be formed on a curved surface of a lens. Still instead, the diffractive optical element GD may be a separate-multilayer diffractive optical element in which an air gap is provided between the first diffractive optical member G1 and the second diffractive optical member G2 and a diffraction grating (blazed structure) is formed on each of the diffractive optical members or a monolayer diffractive optical element in which the second diffractive optical member G2 is replaced with air.

In the case of a blazed diffraction grating that forms a diffractive optical surface of such a diffractive optical element, the design wavelength is determined by the refractive indices of the materials in front of and behind the blazed structure of the diffraction grating (first diffractive optical member G1 and second diffractive optical member G2 in FIG. 1, as described above) and the grating height of the blazed structure of the diffraction grating. The higher the grating height, the longer the design wavelength, resulting in improvement in the diffraction efficiency in a longer wavelength region and a decrease in the diffraction efficiency in a shorter wavelength region. That is, in terms of the color tone of the flare light, the higher the grating height, the smaller the amount of red component of the flare light and the greater the amounts of green and blue components of the flare light. The flare coloring can be reduced by partially optimizing the grating height in association with the red flare that occurs outside the green and blue flare spots.

First Embodiment

To reduce the occurrence of the flare light (red flare light in particular) described above, the diffractive optical element GD according to the present embodiment is so configured that the grating height of the diffraction grating in a central region Ac around an optical axis Z is smaller than the grating height of the diffraction grating in a peripheral region Ap, as shown in FIG. 1.

Specifically, the diffractive optical element GD according to the present embodiment desirably satisfies Conditional Expressions (1) and (2) shown below.

$$0.50 < rc < 0.98 \quad (1)$$

$$0.01\% < \Delta h/h0 < 10.00\% \quad (2)$$

where r: Normalized radius (quotient resulting from operation of dividing height from optical axis Z in direction perpendicular to optical axis Z by effective diameter), h0: Average of the grating heights of the diffraction grating over the range of $0.00 < r < 0.50$, hmax: Average of the grating heights of the diffraction grating over the range of $0.98 < r < 1.00$, Δh: Difference between hmax and h0, and rc: Normalized radius at which the grating height is (h0+hmax)/2.

Conditional Expression (1) specifies the normalized radius of the boundary between the central region Ac and the peripheral region Ap. When rc is smaller than the lower limit of Conditional Expression (1), the increase in the grating height also affects the portion where the spot of the longer-wavelength red flare light overlaps with the spots of the shorter-wavelength green and blue flare light (portion where amount of coloring is small), resulting in an unpreferable increase in intensities of the green and blue flare light inside the flare light spot. To reliably achieve the effect provided by Conditional Expression (1), it is more desirable to set the lower limit of Conditional Expression (1) at 0.65, even 0.70, 0.75, or 0.80. When rc is greater than the upper limit of Conditional Expression (1), the majority of the longer-wavelength red flare light having the maximum flare light spot diameter is not affected by the change in the grating height, resulting in an unpreferable decrease in the effect of reducing the flare light coloring. To reliably achieve the effect provided by Conditional Expression (1), it is more desirable to set the upper limit of Conditional Expression (1) at 0.978, even 0.975, 0.973, or 0.971.

Conditional Expression (2) specifies the difference in grating height between the region that satisfies $0.00 < r < 0.50$ out of the central region Ac and the region that satisfies $0.98 < r < 1.00$ out of the peripheral region Ap. When Δh/h0 is smaller than the lower limit of Conditional Expression (2), an insufficient change in the diffraction efficiency in the longer-wavelength (red) region results in an unpreferable decrease in the effect of reducing the red flare light in the outside (peripheral) region. To reliably achieve the effect provided by Conditional Expression (2), it is more desirable to set the lower limit of Conditional Expression (2) at 0.05%, even 0.10%, 0.15%, 0.20%, 0.25%, or 0.30%. When Δh/h0 is greater than the upper limit of Conditional Expression (2), the design wavelength shifts toward the longer-wavelength region by too large an amount, resulting in too high unpreferable intensity of the green flare light in the inner (central) region because the diffraction efficiency in the shorter-wavelength (green and blue) region decreases. To reliably achieve the effect provided by Conditional Expression (2), it is more desirable to set the upper limit of Conditional Expression (2) at 9.00%, even 8.00%, 7.000, 6.000, or 5.000.

Second Embodiment

Figure 2:
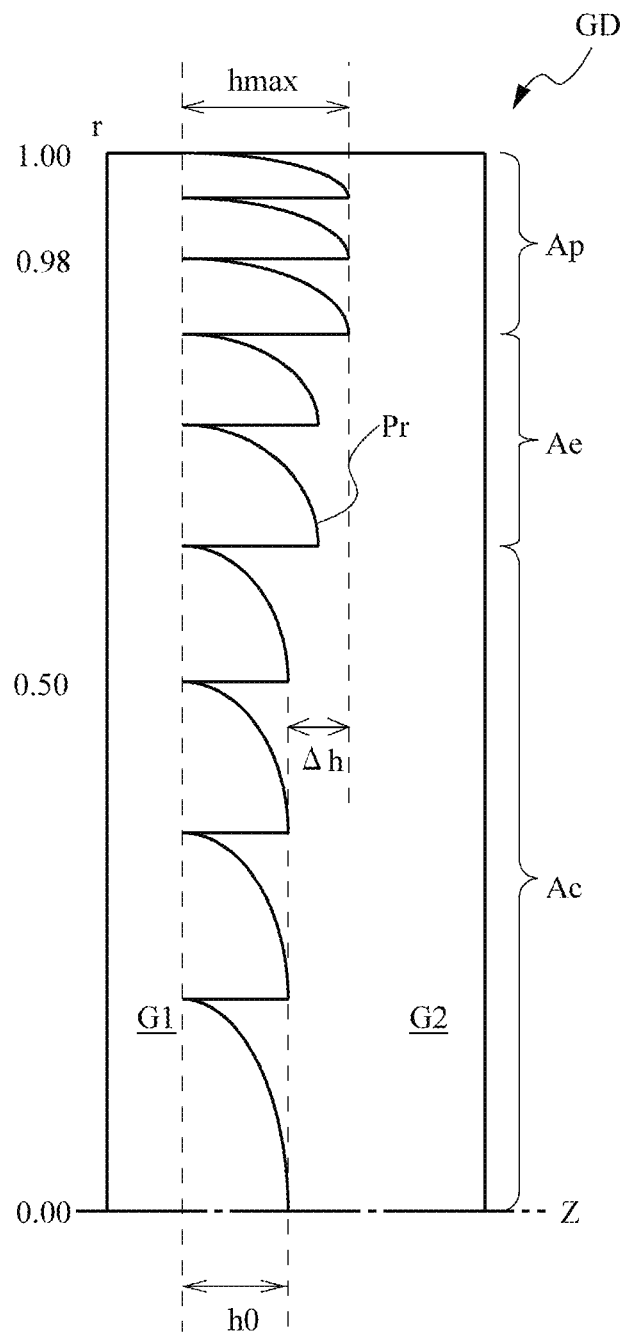
FIG. 2 is a diagrammatic view showing a cross section of a diffractive optical element according to a second embodiment.

The configuration described above has been described with reference to the case where the central region Ac has a normalized radius ranging from 0.00 to 0.50, the average of the grating heights in the region is h0, the peripheral region Ap has a normalized radius ranging from 0.98 to 1.00, and the average of the grating heights in the region is hmax. In a case where the diffraction grating is so configured that the grating height in the central region Ac is h0 and the grating height in the peripheral region Ap is hmax, as shown in FIG. 2, the diffractive optical element GD according to the present embodiment desirably satisfies Conditional Expression (3) shown below.

$$Se/(Sc+Sp) \leq 50\% \quad (3)$$

where

Sc: Area of the central region Ac,

Sp: Area of the peripheral region Ap, and

Se: Area of a region Ae where a diffraction grating having a grating height different from the grating height h0 and the grating height hmax is formed.

Conditional Expression (3) specifies the ratio of the area of the region Ae other than the central region Ac and the peripheral region Ap (region having grating height that is neither h0 nor hmax (intermediate region)) to the total area of the central region Ac and the peripheral region Ap. The intermediate region Ae, which links the central region Ac and the peripheral region Ap to each other, preferably causes the grating height in the central region Ac to gradually increase in the intermediate region Ae to the grating height in the peripheral region Ap, as shown in FIG. 2. When Se/(Sc+Sp) is greater than the upper limit of Conditional Expression (3), the change in color tone in the intermediate region Ae is too gentle, resulting in an unpreferable lower flare light coloring reduction effect. To reliably achieve the effect provided by Conditional Expression (3), it is more desirable to set the upper limit of Conditional Expression (3) at 45%, even 40%, 35%, 30%, 25%, 20%, 15%, or 10%.

Figure 3:
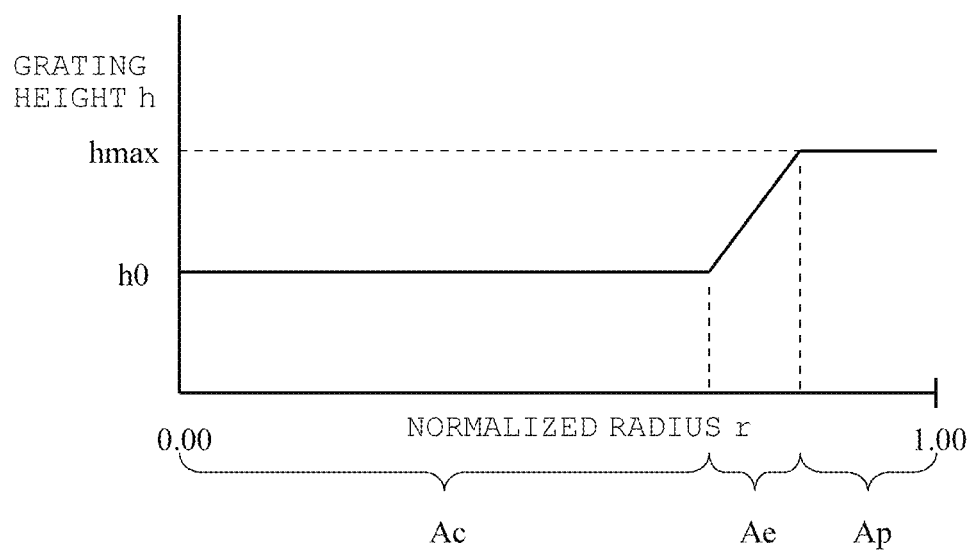
FIG. 3 is a descriptive diagram showing the relationship between a normalized radius and a grating height in the diffractive optical element according to the second embodiment.
Figure 4:
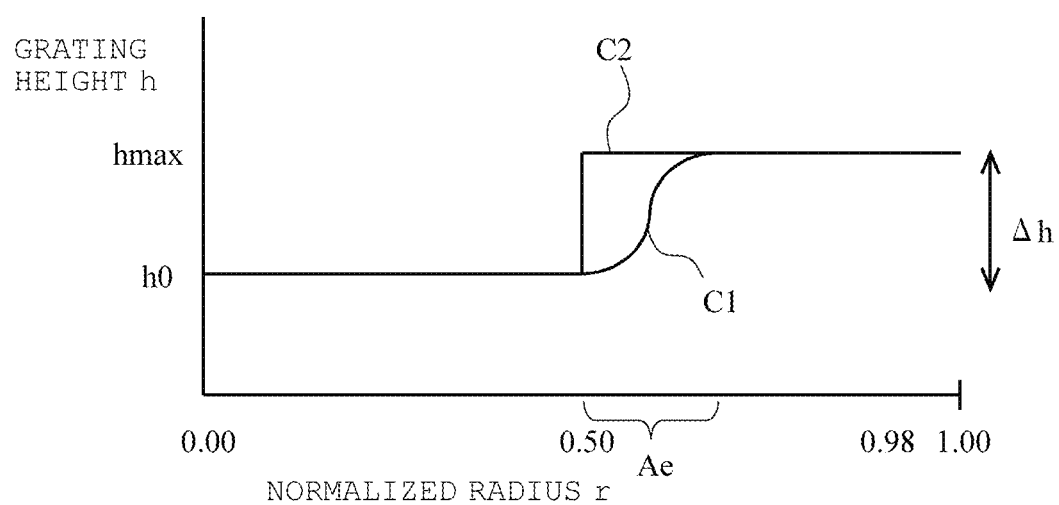
FIG. 4 is a descriptive diagram showing the grating height in an intermediate region in the diffractive optical element according to the second embodiment.

The intermediate region Ae may instead be so configured that the grating height gently changes from the grating height h0 to the grating height hmax, as indicated by FIG. 3 and C1 in FIG. 4 or may still instead be so configured that no intermediate region Ae is provided but the grating height changes stepwise from the grating height h0 to the grating height hmax, as indicated by C2 in FIG. 4.

Third Embodiment

To reduce the occurrence of the flare light (red flare light in particular) described above, the diffractive optical element GD according to the present embodiment is configured to have at least two regions that provide different diffraction efficiencies on a wavelength basis and have the central region Ac, which is the region around the optical axis and having a radius smaller than a predetermined normalized radius, and the peripheral region Ap, which has a radius greater than the predetermined normalized radius.

A flare light ratio $F(\lambda)$, which is the ratio between the zero-order diffracted light ray and the second-order diffracted light ray to the first-order diffracted light ray out of the light rays having the wavelength $\lambda$ and diffracted by the diffractive optical surface (diffraction grating) of the diffractive optical element GD, is defined by Expression (a) below.

$$F(\lambda)=(E_0(\lambda)+E_2(\lambda))/E1(\lambda) \quad (a)$$

where $E_0(\lambda)$: Diffraction efficiency of zero-order diffracted light ray, $E_1(\lambda)$: Diffraction efficiency of first-order diffracted light ray, and $E_2(\lambda)$: Diffraction efficiency of second-order diffracted light ray.

Figure 5:
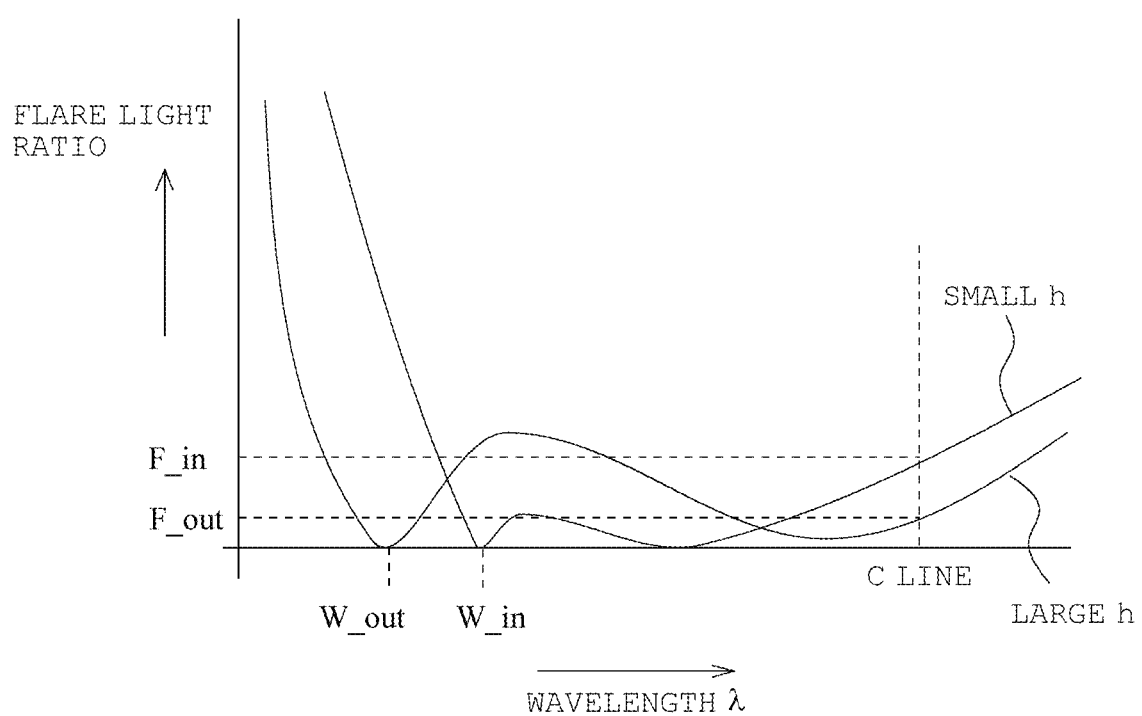
FIG. 5 is a descriptive diagram showing the relationship between the wavelength and a flare light ratio on a grating height basis in the diffractive optical elements according to the third and fourth embodiments.

FIG. 5 shows the flare light ratio of a diffraction grating having a low grating height with respect to the wavelength of the light incident on the diffraction grating and the flare light ratio of a diffraction grating having a high grating height with respect thereto. The diffractive optical element GD according to the present embodiment desirably satisfies Conditional Expressions (4) to (7) shown below.

$$E\_in < E\_out \quad (4)$$

$$0.50 < rs < 0.98 \quad (5)$$

$$E\_in > 90\% \quad (6)$$

$$E\_out > 90\% \quad (7)$$

where rs: Predetermined normalized radius (quotient resulting from operation of dividing height from optical axis in direction perpendicular to optical axis by effective diameter), E_in: Diffraction efficiency of the diffraction grating in the central region Ac at the C line, and E_out: Diffraction efficiency of the diffraction grating in the peripheral region Ap at the C line.

The diffraction efficiencies E (E_in, E_out) at the C line are defined by Expression (b) below by using the flare light ratios F (F_in, F_out) at the C line shown in FIG. 5.

$$E = 1 - F \quad (b)$$

The diffractive optical element GD according to the present embodiment is so configured that the diffraction efficiency of the diffraction grating in the central region Ac at the C line is smaller than the diffraction efficiency of the diffraction grating in the peripheral region Ap at the C line, as indicated by Conditional Expression (4).

Conditional Expression (5) specifies the normalized radius of the boundary between the central region Ac and the peripheral region Ap. When rs is smaller than the lower limit of Conditional Expression (5), the increase in the grating height also affects the portion where the spot of the longer-wavelength red flare light overlaps with the spots of the shorter-wavelength green and blue flare light (portion where amount of coloring is small), resulting in an unpreferable increase in intensities of the green and blue flare light inside the flare light spot. To reliably achieve the effect provided by Conditional Expression (5), it is more desirable to set the lower limit of Conditional Expression (5) at 0.55, even 0.60, 0.65, 0.70, 0.75, or 0.80. When rs is greater than the upper limit of Conditional Expression (5), the portion of the longer-wavelength red flare light having the maximum flare light spot diameter is not affected by the change in the grating height, resulting in an unpreferable decrease in the effect of reducing the flare light coloring. To reliably achieve the effect provided by Conditional Expression (5), it is more desirable to set the upper limit of Conditional Expression (5) at 0.978, even 0.975, 0.973, or 0.971.

Conditional Expressions (6) and (7) specify the diffraction efficiency of the diffraction grating in the central region Ac and the peripheral region Ap at the line C, respectively.

When E_in is smaller than the lower limit of Conditional Expression (6), the reddish color inside the flare spot undesirably becomes more intense. Further, deterioration of the diffraction efficiency in the longer-wavelength region increases the intensity of the flare light, resulting in a decrease in contrast and deterioration in optical performance. To reliably achieve the effect provided by Conditional Expression (6), it is more desirable to set the lower limit of Conditional Expression (6) at 91%, even 93%, 95%, or 97%.

When E_out is smaller than the lower limit of Conditional Expression (7), the reddish color outside the flare spot becomes more intense. Even when a difference is provided between the central region and the peripheral region, the absolute color value is still too reddish. Further, the intensity of the flare light increases, and the optical performance deteriorates accordingly. To reliably achieve the effect provided by Conditional Expression (7), it is more desirable to set the lower limit of Conditional Expression (7) at 91%, even 93%, 95%, or 97%.

The diffractive optical element GD according to the present embodiment further desirably satisfies Conditional Expression (8) shown below.

$$F\_out/F\_in < 0.50 \quad (8)$$

where

F_in: Flare light ratio of the diffraction grating in the central region Ac at C line, and F_out: Flare light ratio of the diffraction grating in the peripheral region Ap at C line.

Conditional Expression (8) specifies the ratio of the flare light ratio of the diffraction grating in the peripheral region Ap at the C line to the flare light ratio of the diffraction grating in the central region Ac at the C line and shows that the flare light ratio in the peripheral region Ap at the C line is preferably smaller than or equal to half the flare light ratio in the central region Ac at the C line. A state in which F_out/F_in is greater than the upper limit of Conditional Expression (8) is unpreferable because the reddish color reduction effect deteriorates. To reliably achieve the effect provided by Conditional Expression (8), it is more desirable to set the upper limit of Conditional Expression (8) at 0.45, even 0.40, 0.35, 0.30, or 0.25.

The diffractive optical element GD according to the present embodiment is desirably used with an optical system having a diffraction efficiency higher than or equal to 90% over a wavelength range from 450 to 650 nm.

Fourth Embodiment

To reduce the occurrence of the flare light (red flare light in particular) described above, the diffractive optical element GD according to the present embodiment is configured to have at least two regions that provide different diffraction efficiencies on a wavelength basis and have the central region Ac, which is the region around the optical axis and having a radius smaller than a predetermined normalized radius, and the peripheral region Ap, which has a radius greater than the predetermined normalized radius.

The diffractive optical element GD according to the present embodiment desirably satisfies Conditional Expressions (9) to (11) shown below.

$$W\_in < W\_out \tag{9}$$

$$0.50 < ra < 0.98 \tag{10}$$

$$5\ nm < W\_out - W\_in < 50\ nm \tag{11}$$

where ra: Predetermined normalized radius (quotient resulting from operation of dividing height from optical axis in direction perpendicular to optical axis by effective diameter), W_in: Wavelength at which the diffraction efficiency is maximized in the diffraction grating in the central region Ac, and W_out: Wavelength at which the diffraction efficiency is maximized in the diffraction grating in the peripheral region Ap.

In a case where a plurality of wavelengths at which the diffraction efficiency is maximized are present, the local shortest wavelength in the range from visible light to the infrared light is employed.

The diffractive optical element GD according to the present embodiment is so configured that the wavelength at which the diffraction efficiency is maximized in the peripheral region Ap is longer than the wavelength at which the diffraction efficiency is maximized in a central region Ac, as indicated by Conditional Expression (9). The wavelength at which the diffraction efficiency is maximized is the wavelength at which the flare light ratio is minimized, as shown in FIG. 5 and indicated by Expression (b).

Conditional Expression (10) specifies the normalized radius of the boundary between the central region Ac and the peripheral region Ap. When ra is smaller than the lower limit of Conditional Expression (10), the increase in the grating height also affects the portion where the spot of the longer-wavelength red flare light overlaps with the spots of the shorter-wavelength green and blue flare light (portion where amount of coloring is small), resulting in an unpreferable increase in intensities of the green and blue flare light inside the flare light spot. To reliably achieve the effect provided by Conditional Expression (10), it is more desirable to set the lower limit of Conditional Expression (10) at 0.55, even 0.60, 0.65, 0.70, 0.75, or 0.80. When ra is greater than the upper limit of Conditional Expression (10), the majority of the longer-wavelength red flare light having the maximum flare light spot diameter is not affected by the change in the grating height, resulting in an unpreferable decrease in the effect of reducing the flare light coloring. To reliably achieve the effect provided by Conditional Expression (10), it is more desirable to set the upper limit of Conditional Expression (10) at 0.978, even 0.975, 0.973, or 0.971.

Conditional Expression (11) specifies the difference between the wavelength at which the diffraction efficiency of the diffraction grating in the central region Ac is maximized and the wavelength at which the diffraction efficiency of the diffraction grating in the peripheral region Ap is maximized. When W_out−W_in is smaller than the lower limit of Conditional Expression (11), the increase in the grating height also affects the portion where the spot of the longer-wavelength red flare light overlaps with the spots of the shorter-wavelength green and blue flare light (portion where amount of coloring is small), resulting in an unpreferable increase in intensities of the green and blue flare light inside the flare light spot and decrease in the effect of reducing the flare light coloring. To reliably achieve the effect provided by Conditional Expression (11), it is more desirable to set the lower limit of Conditional Expression (11) at 10 nm, even 12 nm, or 15 nm. When W_out−W_in is greater than the upper limit of Conditional Expression (11), the majority of the longer-wavelength red flare light having the maximum flare light spot diameter is not affected by the change in the grating height, resulting not only in an unpreferable increase in the decrease in the diffraction efficiency but in an unpreferable greenish intermediate portion of the flare light spot. To reliably achieve the effect provided by Conditional Expression (11), it is more desirable to set the upper limit of Conditional Expression (11) at 45 nm, even 40 nm, 35 nm, or 30 nm.

The diffractive optical element GD according to the present embodiment is desirably used with an optical system having a diffraction efficiency higher than or equal to 90% over the wavelength range from 450 to 650 nm.

Further, the diffractive optical element GD according to the present embodiment described above is desirably so configured that the design order is fixed across the region within the effective diameter.

The diffractive optical element GD according to the present embodiment described above is desirably what is called a multilayer diffractive optical element made of two optical materials having different refractive indices with the diffraction grating described above formed along the boundary surface between the optical materials. The configuration described above allows the diffraction efficiency to be improved across the visible light range.

Figure 6:
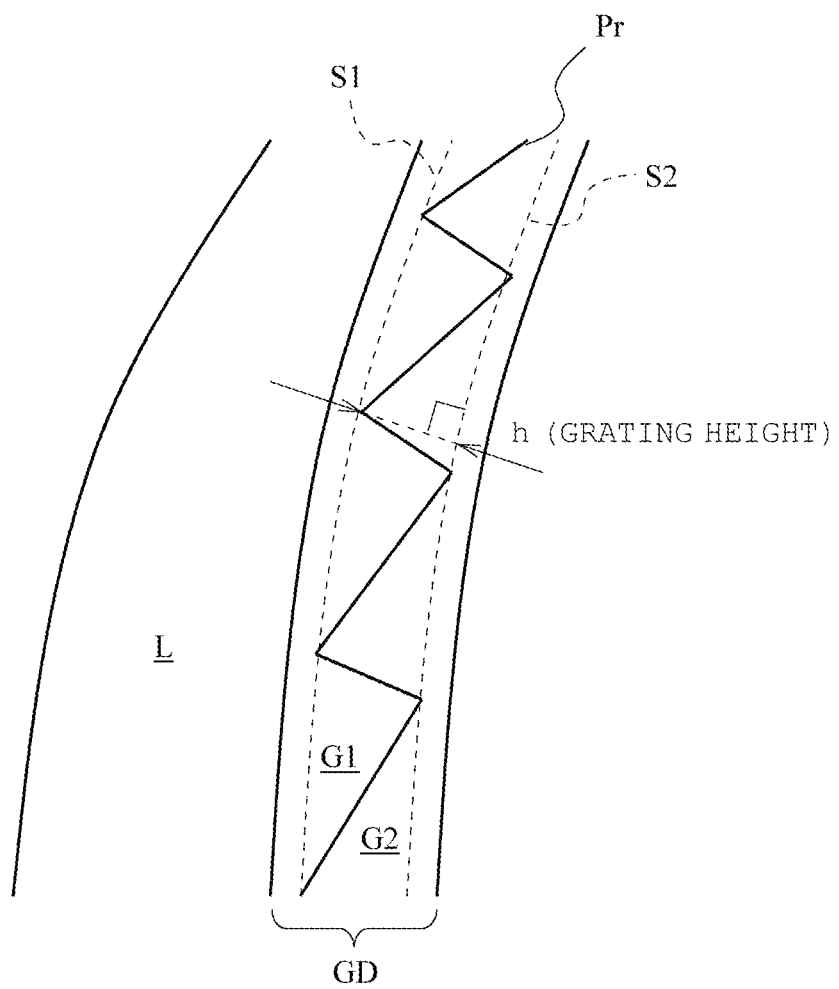
FIG. 6 is a descriptive diagram showing the grating height of the diffractive optical element according to the present embodiment formed on a lens surface.

It is assumed that the grating height h in a case where the diffractive optical element GD is formed along a lens surface (curved surface) of a lens L is the distance between a line S1, which connects the tops of the diffraction grating (blazed structure) to each other and a line S2, which connects the bottoms of the diffraction grating (blazed structure) to each other (distance in direction perpendicular to lines S1 and S2) as shown in FIG. 6.

The diffractive optical element GD according to the present embodiment described above can be used with an optical system. Specifically, in an optical system OL including a first lens group G1 having positive refracting power and a second lens group G2 having negative refracting power with the two lens groups sequentially arranged from the object side, providing the first lens group G1 with the diffractive optical element GD described above allows the optical system to have a small amount of flare coloring and excel in optical performance with a decrease in diffraction efficiency minimized.

The optical system OL desirably satisfies Conditional Expression (12) shown below.

$$0.001 < f1/fpf < 0.030 \tag{12}$$

where f1: Focal length of the first lens group G1, and fpf: Focal length of the diffractive optical element GD.

Conditional Expression (12) specifies the ratio of the focal length of the diffractive optical element GD to the focal length of the first lens group G1. When Conditional Expression (12) is satisfied, the longitudinal and lateral chromatic aberrations can be satisfactorily corrected. When f1/fpf is smaller than the lower limit of Conditional Expression (12), the focal length of the diffractive optical element GD increases (refracting power decreases), so that the ±first-order diffracted light does not greatly spread, and the visibility of the flare coloring decreases. However, when the grating height is changed in the middle of the diffraction grating, a harmful effect of a decrease in overall diffraction efficiency causes an unpreferable result of overwhelming the advantage. To reliably achieve the effect provided by Conditional Expression (12), it is more desirable to set the lower limit of Conditional Expression (12) at 0.003, even 0.005, 0.008, or 0.010. When f1/fpf is greater than the upper limit of Conditional Expression (12), the focal length of the diffractive optical element GD decreases (refracting power increases), so that the ±first-order diffracted light spreads too much and becomes pale with low intensity that causes the visibility of the light to be small. However, when the grating height is changed in the middle of the diffraction grating, a harmful effect of a decrease in overall diffraction efficiency causes an unpreferable result of overwhelming the advantage. To reliably achieve the effect provided by Conditional Expression (12), it is more desirable to set the upper limit of Conditional Expression (12) at 0.025, even 0.020, 0.018, or 0.015.

The conditions and configurations described above provide the respective effects described above, and all the conditions or configurations are not limited necessarily to be satisfied. A diffractive optical element that satisfies any of the conditions and configurations or a combination of any of the conditions and configurations can provide the effects described above.

Figure 20:
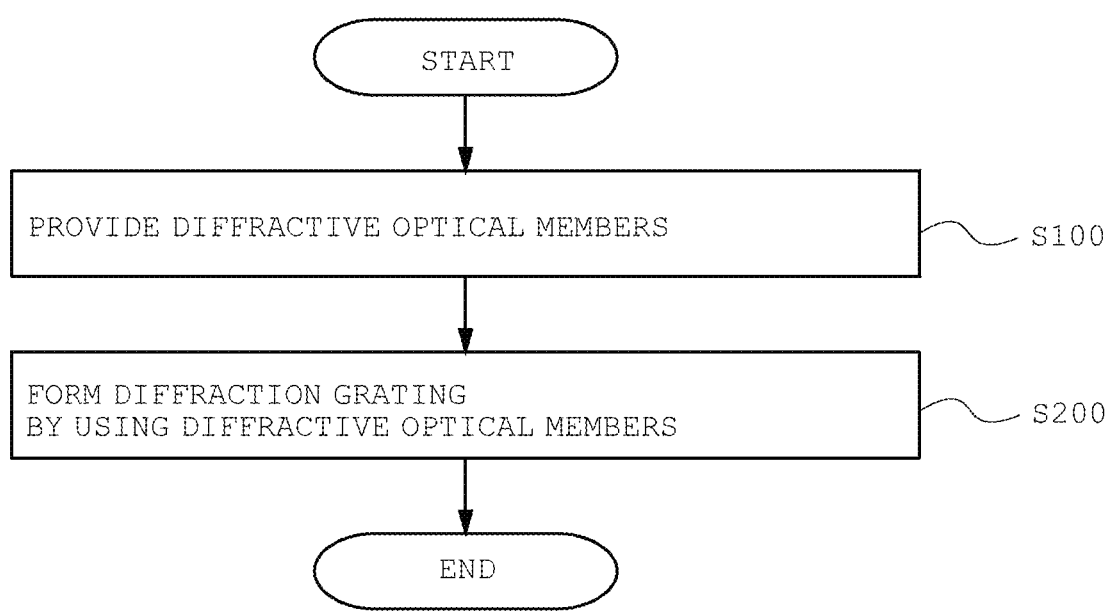
FIG. 20 is a flowchart showing a method for producing the diffractive optical element.

An overview of a method for producing the diffractive optical element GD according to any of the embodiments of the present invention will be described below with reference to FIG. 20. The diffractive optical members that form the diffractive optical element GD are first provided (step S100). In the configuration shown in FIG. 1, the diffractive optical members are, for example, the first diffractive optical member G1 and the second diffractive optical member G2. A diffraction grating is so formed by using the diffractive optical members that the grating height of the diffraction grating in the central region around the optical axis is smaller than the grating height of the diffraction grating in the peripheral region (step S200).

As described above, the present embodiment can provide an excellent diffractive optical element having a small amount of flare coloring and unaffected optical performance with a decrease in diffraction efficiency minimized and an optical system and an optical apparatus using the diffractive optical element.

EXAMPLES

Examples of Diffractive Optical Element

Examples of the diffractive optical element GD described above will be described below.

First Example of Diffractive Optical Element

The first example relates to an intimate-contact-multilayer diffractive optical element GD, which is formed of a first diffractive optical member G1 made of a first optical material characterized by low refraction and high dispersion and a second diffractive optical member G2 made of a second optical material characterized by high refraction and low dispersion and in which a blazed structure Pr (relief pattern), which forms a blazed (sawtooth-shaped) diffraction grating, is provided between the first diffractive optical member G1 and the second diffractive optical member G2 with the blazed structure Pr being in intimate contact with the two diffractive optical members, as shown in FIG. 1. The refractive index $n_1(\lambda)$ of the optical material of the first diffractive optical member G1 with respect to light having a wavelength $\lambda$ is defined by Expression (c) below, and the refractive index $n_2(\lambda)$ of the optical material of the second diffractive optical member G2 with respect to the light having the wavelength $\lambda$ is defined by Expression (d) below.

$$n_1(\lambda) = A_0 + A_1 \cdot \lambda^2 + A_2 \cdot \lambda^{-2} + A_3 \cdot \lambda^{-4} + A_4 \cdot \lambda^{-6} + A_5 \cdot \lambda^{-8} \quad (c)$$

$$n_2(\lambda) = B_0 + B_1 \cdot \lambda^2 + B_2 \cdot \lambda^{-2} + B_3 \cdot \lambda^{-4} + B_4 \cdot \lambda^{-6} + B_5 \cdot \lambda^{-8} \quad (d)$$

Table 1 below shows the coefficients in Expressions (c) and (d) described above. In Table 1, the upper row shows the coefficients for An, and the lower row shows the coefficients for Bn (n=0, 1, . . . , 5).

TABLE 1

| A0/B0 | A1/B1 | A2/B2 | A3/B3 | A4/B4 | A5/B5 |
|---|---|---|---|---|---|
| 2.29366 | 0.00071 | 0.019114 | 0.001897 | −0.00028 | 0.0000304 |
| 2.435204 | −0.02572 | −0.01407 | 0.009837 | −0.0014 | 0.0000783 |

FIGS. 7(a) and 7(b) show the flare light coloring due to the unwanted diffracted light rays in the diffractive optical element GD according to the thus configured first example provided that h0=22.8 μm, hmax=23.8 μm, that is, Δh/h0=4.4%, and rc=0.97, and Table 2 shows the luminance of the flare light. For comparison purposes, FIGS. 7(c) and 7(d) show the flare light coloring in a case where rc=1.00 (grating height is fixed within effective diameter), and Table 2 shows the luminance of the flare light. FIGS. 7(a) and 7(c) show spot images, and FIGS. 7(b) and 7(d) are diagrammatic views showing the boundaries of the spot images.

In Table 2, H represents the radial position with respect to the flare light spot diameter, R represents the luminance of red light, G represents the luminance of green light, and B represents the luminance of blue light. The R, G, and B values representing the luminance are each the flare light intensity multiplied by the spectrometric sensitivity of an imaging element on a wavelength basis and the spectrometric transmittance of a lens on a wavelength basis provided that the light source is the sunlight.

In FIGS. 7(b) and 7(d), which show spot images, a region P1 represents a central portion having a roughly uniform color tone, and a region P2 represents a peripheral portion showing a noticeable red color. In FIGS. 7(a) and 7(c), the central white portion of each of the spot images is not flare light due to diffraction but is an image of the light source.

TABLE 2

| | rc | | | | | |
|---|---|---|---|---|---|---|
| | 0.97 | | | 1.00 | | |
| H | R | G | B | R | G | B |
| 0.80~0.85 | 65 | 20 | 3 | 64 | 4 | 2 |
| 0.85~0.90 | 60 | 2 | 2 | 64 | 2 | 2 |

TABLE 2-continued

| | rc | | | | | |
|---|---|---|---|---|---|---|
| | 0.97 | | | 1.00 | | |
| H | R | G | B | R | G | B |
| 0.90~0.95 | 20 | 0 | 1 | 42 | 1 | 2 |
| 0.95~1.00 | 2 | 0 | 0 | 10 | 0 | 1 |

Figure 7:
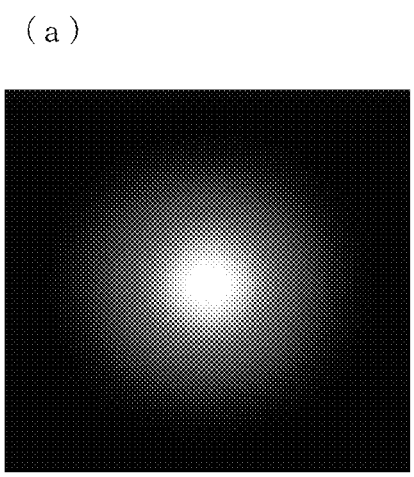
FIG. 7 is a descriptive diagram showing spot images produced by a diffractive optical element according to a first example.
Figure 7:
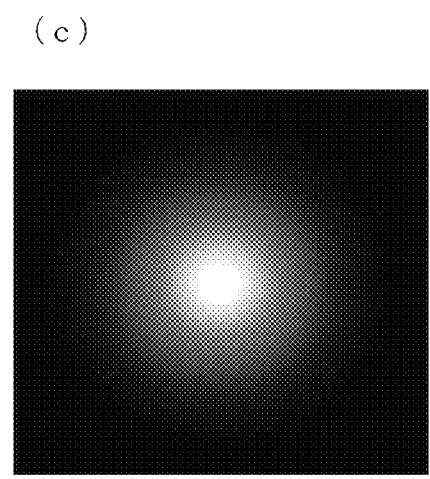
Figure 7:
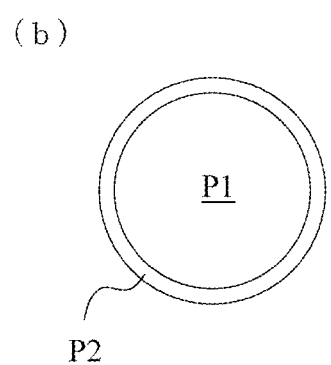
Figure 7:
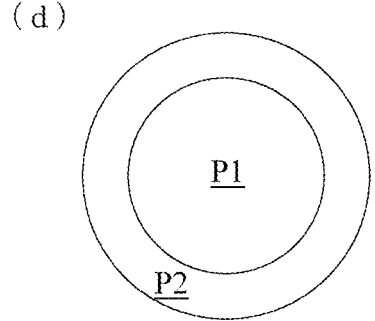

Table 2 and FIG. 7 clearly show that the diffractive optical element according to the first example (diffractive optical element with rc=0.97) allows the intensity of the red light (R), out of the unwanted diffracted light rays, to be lowered and the flare light coloring to be suppressed particularly in the peripheral region P2 (H=0.85 to 1.00), as compared with a diffractive optical element of related art (diffractive optical element with rc=1.00).

Second Example of Diffractive Optical Element

A second example shows a case where a monolayer blazed diffraction grating is formed by using optical glass (BK7) as the diffractive optical element GD. That is, the diffractive optical element GD is a single-phase diffractive optical element with the second diffractive optical member G2 being air in FIG. 1.

Figure 8:
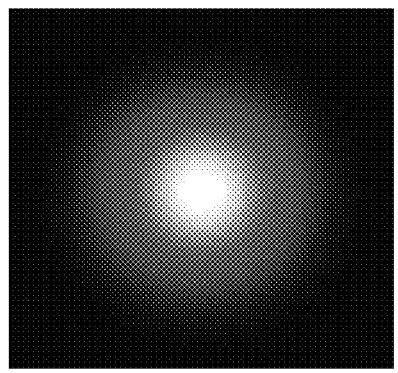
FIG. 8 is a descriptive diagram showing spot images produced by a diffractive optical element according to a second example.
Figure 8:
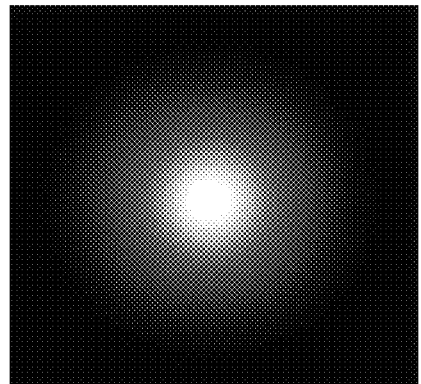
Figure 8:
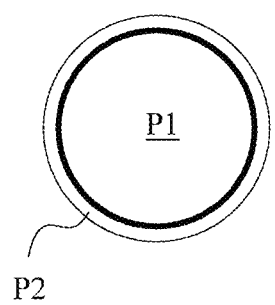
Figure 8:
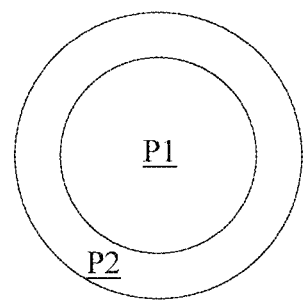

FIGS. 8(a) and 8(b) show the flare light coloring due to the unwanted diffracted light rays in the diffractive optical element GD according to the thus configured second example provided that h0=1000 nm, hmax=1090 nm, that is, Δh/h0=9.0%, and rc=0.93, and Table 3 shows the luminance of the flare light. For comparison purposes, FIGS. 8(c) and 8(d) show the flare light coloring in a case where rc=1.00 (grating height is fixed within effective diameter), and Table 3 shows the luminance of the flare light. The descriptions of FIG. 9 and Table 3 are the same as those of FIG. 8 and Table 2 in the first example described above.

TABLE 3

| | rc | | | | | |
|---|---|---|---|---|---|---|
| | 0.93 | | | 1.00 | | |
| H | R | G | B | R | G | B |
| 0.80~0.85 | 72 | 6 | 2 | 97 | 26 | 3 |
| 0.85~0.90 | 45 | 2 | 2 | 81 | 8 | 2 |
| 0.90~0.95 | 14 | 0 | 1 | 30 | 1 | 1 |
| 0.95~1.00 | 3 | 0 | 0 | 5 | 0 | 0 |

Table 3 and FIG. 8 clearly show that the diffractive optical element according to the second example (diffractive optical element with rc=0.93) allows the intensity of the red light (R), out of the unwanted diffracted light rays, to be lowered and the flare light coloring to be suppressed particularly in the peripheral region P2 (H=0.85 to 1.00), as compared with a diffractive optical element of related art (diffractive optical element with rc=1.00). In the diffractive optical element according to the second example, an intermediate portion where the green component slightly increases is formed at the boundary between the central region P1 and the peripheral region P2.

Examples of Optical System

Examples of the optical system using the diffractive optical element GD described above will next be described based on the drawings. FIGS. 9, 11, 13, 15, and 17 are cross-sectional views showing the configuration and the refractive index distribution of the optical system OL according to Examples (OL1 to OL5).

In Examples, a phase shape φ of the diffractive optical surface is expressed by Expression (e) below.

$$\varphi(h,n) = (2\pi/(n \times \lambda 0)) \times (C2h^2 + C4h^4) \quad (e)$$

where
h: Height from the optical axis in the vertical direction,
n: Order of diffracted light,
λ0: Design wavelength, and
Ci: Phase coefficient (i=2, 4).

Refracting power φD of the diffractive optical surface expressed by Expression (e) for an arbitrary wavelength λ and an arbitrary diffraction order m is expressed by Expression (f) by using the lowest-order phase coefficient C2.

$$\varphi D(\lambda, n) = -2 \times C2 \times n \times \lambda/\lambda 0 \quad (f)$$

First Example of Optical System

Figure 9:
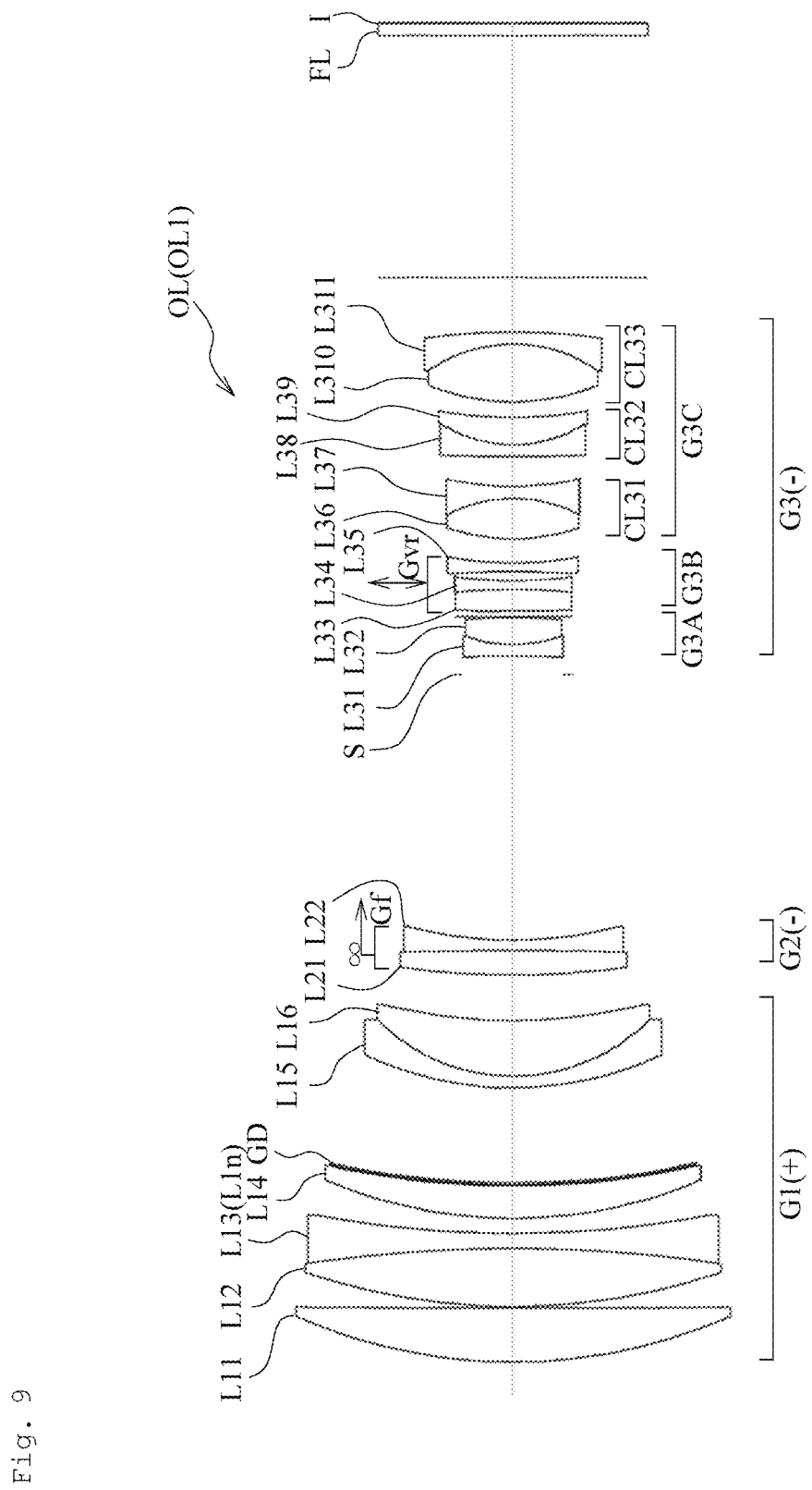
FIG. 9 is a cross-sectional view showing the lens configuration of an optical system according to a first example in an infinity focus state.

FIG. 9 shows the configuration of the optical system OL1 according to a first example. The optical system OL1 the following components sequentially arranged from the object side: a first lens group G1 having positive refracting power; a second lens group G2 having negative refracting power; an aperture stop S; and a third lens group G3 having negative refracting power, and the second lens group G2 is moved along the optical axis to serve as a focusing lens group Gf for focusing.

The first lens group G1 is formed of the following lenses sequentially arranged from the object side: a biconvex positive lens L11; a cemented positive lens formed of a biconvex positive lens L12 and a biconcave negative lens L13 cemented to each other; a positive meniscus lens L14 having a concave surface facing the image side with the intimate-contact-multiplayer diffractive optical element GD using two types of different materials and formed on the concave surface; and a cemented negative lens formed of a negative meniscus lens L15 having a convex surface facing the object side and a positive meniscus lens L16 having a convex surface facing the object side with the lenses L15 and L16 cemented to each other. The second lens group G2 is formed of a cemented negative lens formed of a biconvex positive lens L21 and a biconcave negative lens L22 sequentially arranged from the object side and cemented to each other. The third lens group G3 is formed of the following lenses sequentially arranged from the object side: a cemented negative lens formed of a biconcave negative lens L31 and a biconvex positive lens L32 cemented to each other; a cemented negative lens formed of a biconvex positive lens L33 and a biconcave negative lens L34 cemented to each other; a biconcave negative lens L35; a cemented positive lens CL31 formed of a biconvex positive lens L36 and a biconcave negative lens L37 cemented to each other; a cemented negative lens CL32 formed of a negative meniscus lens L38 having a convex surface facing the object side and a positive meniscus lens L39 having a convex surface facing the object side with the lenses L38 and L39 cemented to each other; and a cemented positive lens CL33 formed of a biconvex positive lens L310 and a negative meniscus lens L311 having a concave surface facing the object side with the lenses L310 and L311 cemented to each other. A filter FL is disposed between the third lens group G3 and an image plane I. In the lens data shown in (Table 4), the twentieth surface represents an imaginary surface.

The optical system OL1 according to the first example is so configured that the cemented negative lens formed of the biconvex positive lens L33 and the biconcave negative lens L34 cemented to each other and the biconcave negative lens L35 in the third lens group G3 form an antivibration group Gvr, and that the antivibration group Gvr is so moved as to be displaced in the directions perpendicular to the optical axis to correct a change in the image position resulting, for example, from vibration of the optical system OL1.

Table 4 below shows values of the variety of parameters of the optical system OL1. In Table 4, the field of a variety of overall parameters shows the following parameters: f represents the overall focal length; FNO represents the F number, w represents the half angle of view, and TL represents the total length. The total length TL represents the distance from the lens surface closest to the object side (first surface) to the image plane I along the optical axis. In the field of lens data, the first field m shows the sequence of the lens surfaces (surface numbers) counted from the object side along the direction in which the light rays travel, the second field r shows the radius of curvature of each of the lens surfaces, the third field d shows the on-axis distance (intersurface distance) from each optical surface to the following optical surface, the fourth field vd and the fifth field nd show the Abbe number and the refractive index at the d line (λ=587.6 nm), and the sixth field θgF shows the partial dispersion ratio. The radius of curvature 0.0000 represents a flat surface, and the refractive index of air of 1.00000 is omitted. The lens group focal distance shows the numbers of the first surfaces of the first to third lens groups G1 to G3 and the focal lengths of the lens groups.

The focal length f, the radius of curvature r, the intersurface distance d, and the other lengths listed in the field of a variety of all parameters below are typically expressed by using the unit "mm," but not necessarily, because the optical system, even when proportionally enlarged or reduced, provides the same optical performance. The above descriptions of the reference characters and the table of a variety of parameters also apply to the following examples.

TABLE 4

First example

[Overall Parameters]

| | |
|---|---|
| f = | 391.74403 |
| FNO = | 5.76593 |
| ω = | 3.12480 |
| TL = | 229.99999 |

[Lens data]

| m | r | d | vd | nd | θgF |
|---|---|---|---|---|---|
| Object plane | ∞ | | | | |
| 1 | 90.5290 | 9.0224 | 70.32 | 1.487490 | 0.5291 |
| 2 | 3476.6214 | 0.2500 | | | |
| 3 | 108.6866 | 9.7966 | 70.32 | 1.487490 | 0.5291 |
| 4 | −237.7886 | 2.5000 | 44.46 | 1.612660 | 0.564 |
| 5 | 179.8167 | 2.5000 | | | |
| 6 | 80.0400 | 5.4497 | 64.13 | 1.516800 | 0.5357 |
| 7 | 140.7615 | 0.2000 | 33.36 | 1.527800 | 0.6291 |
| 8* | 140.7615 | 0.3000 | 49.98 | 1.557147 | 0.5688 |
| 9 | 140.7615 | 15.9286 | | | |
| 10 | 57.9333 | 2.0000 | 42.73 | 1.834810 | 0.5648 |
| 11 | 32.3388 | 9.3177 | 70.32 | 1.487490 | 0.5291 |
| 12 | 90.7740 | D1 | | | |
| 13 | 132.6572 | 4.1393 | 33.72 | 1.647690 | 0.593 |
| 14 | −523.0292 | 1.7000 | 50.27 | 1.719990 | 0.5527 |
| 15 | 67.7680 | D2 | | | |

TABLE 4-continued

First example

| | | | | | |
|---|---|---|---|---|---|
| 16 | 0.0000 | 3.0000 | | | |
| 17 | −434.3952 | 2.0000 | 46.59 | 1.816000 | 0.5567 |
| 18 | 23.9849 | 4.4832 | 58.82 | 1.518230 | 0.5449 |
| 19 | −100.9429 | 0.1000 | | | |
| 20 | 0.0000 | 1.0000 | | | |
| 21 | 397.4081 | 3.6000 | 25.45 | 1.805180 | 0.6157 |
| 22 | −96.5962 | 1.5000 | 67.90 | 1.593190 | 0.544 |
| 23 | 69.4057 | 1.5000 | | | |
| 24 | −199.5009 | 1.5000 | 67.90 | 1.593190 | 0.544 |
| 25 | 60.2877 | 4.0000 | | | |
| 26 | 33.8022 | 6.7774 | 39.21 | 1.595510 | 0.5806 |
| 27 | −23.0330 | 2.0000 | 82.57 | 1.497820 | 0.5386 |
| 28 | 49.4624 | 5.0000 | | | |
| 29 | 257.9794 | 2.0000 | 46.59 | 1.816000 | 0.5567 |
| 30 | 22.5049 | 4.5956 | 44.46 | 1.612660 | 0.564 |
| 31 | 76.0065 | 2.5663 | | | |
| 32 | 38.0090 | 9.7423 | 40.98 | 1.581440 | 0.5763 |
| 33 | −24.5636 | 2.0000 | 22.74 | 1.808090 | 0.6287 |
| 34 | −105.7609 | 9.1491 | | | |
| 35 | 0.0000 | 40.5814 | | | |
| 36 | 0.0000 | 2.0000 | 63.88 | 1.516800 | 0.536 |
| 37 | 0.0000 | BF | | | |
| Image plane | ∞ | | | | |

[Focal length of lens groups]

| Lens group | First surface | Focal length |
|---|---|---|
| First lens group | 1 | 120.3 |
| Second lens group | 13 | −175.5 |
| Third lens group | 16 | −81.2 |

In the optical system OL1, the eighth surface is the diffractive optical surface. Table 5 below shows data on the diffractive optical surface, that is, the values of the design wavelength λ0, the order n, and the phase coefficients C2 and C4.

TABLE 5

[Data on diffractive optical surface]

| m | λ0 | n | C2 | C4 |
|---|---|---|---|---|
| 8 | 587.6 | 1.0 | −5.00000E−05 | 3.46148E−10 |

Further, in the optical system OL1, an on-axis air gap D1 between the first lens group G1 and the second lens group G2, an on-axis air gap D2 between the second lens group G2 and the third lens group G3, and a back focal length BF change at the time of focusing. Table 6 below shows variable gaps in an infinity focus state, an intermediate distance focus state, and a short distance focus state. Reference character D0 represents the distance from a surface that forms the optical system OL1 and is closest to the object side (first surface). Reference character f represents the focal length. Reference character β represents the magnification. The back focal length BF represents the on-axis distance (air conversion length) from the optical surface closest to the image plane (thirty-seventh surface) to the image plane I (the description also applies to the following examples).

TABLE 6

[Variable distance data]

| State of focusing | Infinity | Middle distance | Close distance |
|---|---|---|---|
| f | 391.74403 | — | — |
| β | — | −0.03333 | −0.22277 |
| D0 | ∞ | 11775.1260 | 1770.0002 |
| D1 | 7.61558 | 9.90206 | 24.63002 |
| D2 | 44.58471 | 42.29823 | 27.62027 |
| BF | 0.09999 | 0.10000 | 0.09999 |

Table 7 below shows values satisfying the conditions in the optical system OL1.

TABLE 7 fpf = 10000.0
[Values compliant to conditional expressions]

(12) f1/fpf = 0.012

As described above, the optical system OL1 satisfies Conditional Expression (12) described above.

Figure 10:
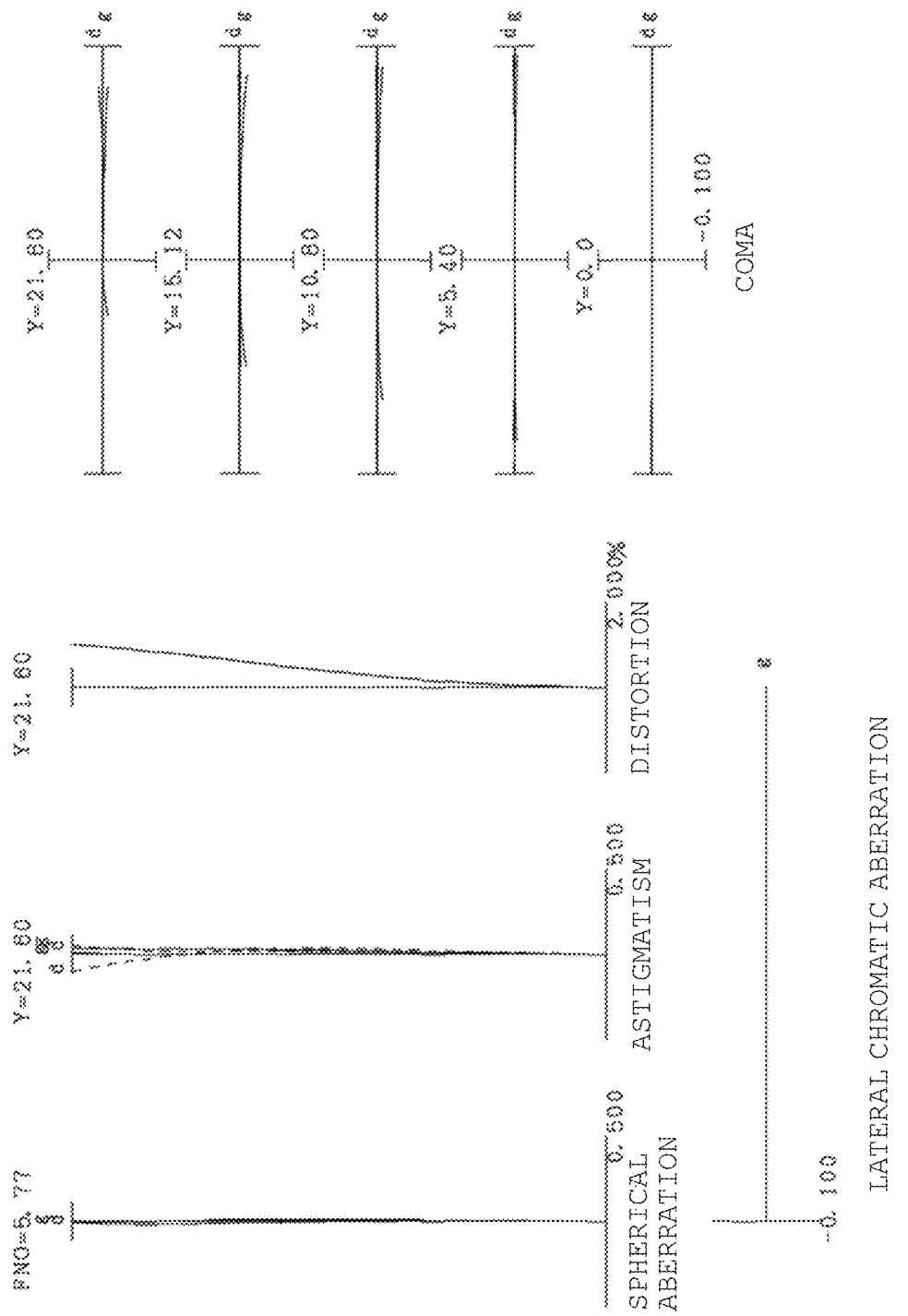
FIG. 10 shows a variety of aberrations of the optical system according to the first example in the infinity focus state.

FIG. 10 includes a spherical aberration diagram, an astigmatism diagram, a distortion diagram, a lateral chromatic aberration diagram, and a coma diagram in the infinity focus state of the optical system OL1. In each of the aberration diagrams, FNO represents the F number, and Y represents the image height. The spherical aberration diagram shows the F number corresponding to the maximum aperture diameter. The astigmatism diagram and the distortion diagram show the maximum image height. The coma diagram shows various image heights. Reference character d represents the d line ($\lambda$=587.6 nm), and Reference character g represents the g line ($\lambda$=435.8 nm). In the astigmatism diagram, the solid line represents the sagittal image plane, and the broken line represents the meridional image plane. The same reference characters as those in the present example will also be used in the aberration diagrams in the examples shown below. The aberration diagrams show that the variety of aberrations of the optical system OL1 are corrected in a satisfactory manner over the range from the infinity focus state to the short-distance focus state.

Second Example of Optical System

Figure 11:
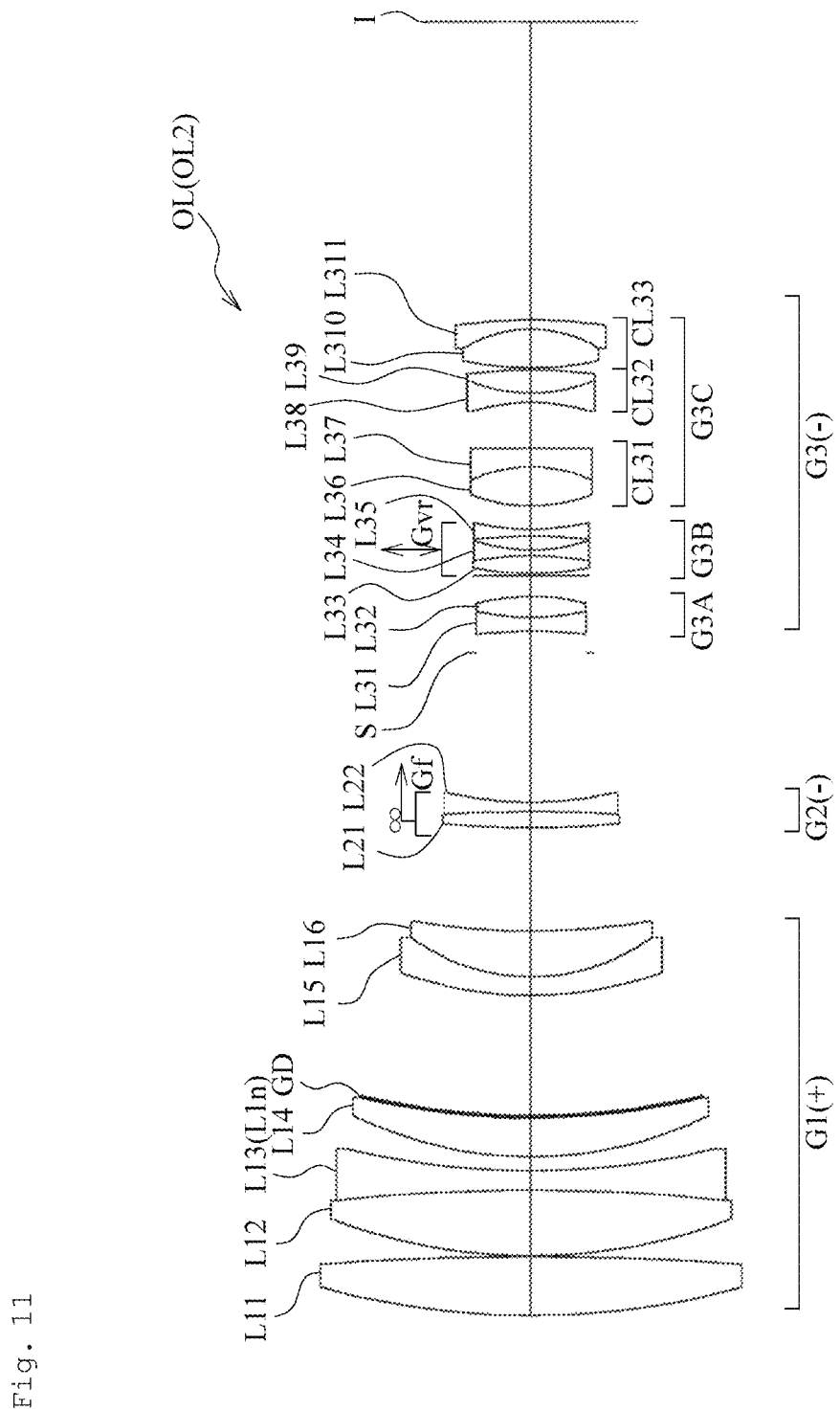
FIG. 11 is a cross-sectional view showing the lens configuration of an optical system according to a second example in the infinity focus state.

FIG. 11 shows the configuration of the optical system OL2 according to a second example. The optical system OL2 includes the following components sequentially arranged from the object side: a first lens group G1 having positive refracting power; a second lens group G2 having negative refracting power; an aperture stop S; and a third lens group G3 having negative refracting power, and the second lens group G2 is moved along the optical axis to serve as a focusing lens group Gf for focusing.

The first lens group G1 is formed of the following lenses sequentially arranged from the object side: a biconvex positive lens L11; a cemented positive lens formed of a biconvex positive lens L12 and a biconcave negative lens L13 cemented to each other; a positive meniscus lens L14 having a concave surface facing the image side with the intimate-contact-multiplayer diffractive optical element GD using two types of different materials and formed on the concave surface; and a cemented negative lens formed of a negative meniscus lens L15 having a convex surface facing the object side and a positive meniscus lens L16 having a convex surface facing the object side with the lenses L15 and L16 cemented to each other. The second lens group G2 is formed of a cemented negative lens formed of a biconvex positive lens L21 and a biconcave negative lens L22 sequentially arranged from the object side and cemented to each other. The third lens group G3 is formed of the following lenses sequentially arranged from the object side: a cemented negative lens formed of a biconcave negative lens L31 and a biconvex positive lens L32 cemented to each other; a cemented negative lens formed of a biconvex positive lens L33 and a biconcave negative lens L34 cemented to each other; a biconcave negative lens L35; a cemented positive lens CL31 formed of a biconvex lens L36 and a negative meniscus lens L37 having a concave surface facing the object side with the lenses L36 and L37 cemented to each other; a cemented negative lens CL32 formed of a biconcave negative lens L38 and a biconvex positive lens L39 cemented to each other; and a cemented positive lens CL33 formed of a biconvex positive lens L310 and a negative meniscus lens L311 having a concave surface facing the object side with the lenses L310 and L311 cemented to each other. In the lens data shown in (Table 8), the twentieth surface represents an imaginary surface.

The optical system OL2 according to the second example is so configured that the cemented negative lens formed of the biconvex positive lens L33 and the biconcave negative lens L34 cemented to each other and the biconcave negative lens L35 in the third lens group G3 form an antivibration group Gvr, and that the antivibration group Gvr is so moved as to be displaced in the directions perpendicular to the optical axis to correct a change in the image position resulting, for example, from vibration of the optical system OL2.

Table 8 below shows values of the variety of parameters of the optical system OL2.

TABLE 8

Second example

[Overall Parameters]

| f = | 489.70405 |
|---|---|
| FNo = | 5.75019 |
| ω = | 2.51062 |
| TL = | 279.32422 |

[Lens data]

| m | r | d | vd | nd | θgF | |
|---|---|---|---|---|---|---|
| Object plane | ∞ | | | | | |
| 1 | 170.0946 | 12.8000 | 70.31 | 1.487490 | 0.5291 | |
| 2 | −624.7082 | 0.1000 | | | | |
| 3 | 122.1897 | 14.2000 | 70.31 | 1.487490 | 0.5291 | |
| 4 | −397.5861 | 4.2000 | 44.46 | 1.612660 | 0.564 | |
| 5 | 168.6766 | 3.0000 | | | | |
| 6 | 87.1890 | 8.4000 | 64.13 | 1.516800 | 0.5356 | |
| 7 | 159.3794 | 0.2000 | 33.41 | 1.527800 | 0.6329 | |
| 8* | 159.3794 | 0.3000 | 49.74 | 1.557100 | 0.5625 | |
| 9 | 159.3794 | 25.8964 | | | | |
| 10 | 82.0499 | 4.0475 | 40.66 | 1.883000 | 0.5669 | |
| 11 | 44.0296 | 9.9231 | 70.31 | 1.487490 | 0.5291 | |
| 12 | 159.8899 | D1 | | | | |
| 13 | 213.6406 | 3.5000 | 33.73 | 1.647690 | 0.5931 | |
| 14 | −289.8235 | 2.0000 | 50.27 | 1.7199900 | 0.5527 | |
| 15 | 81.1056 | D2 | | | | |
| 16 | 0.0000 | 4.6833 | | | | S |
| 17 | −96.9087 | 3.0000 | 46.59 | 1.816000 | 0.5567 | |
| 18 | 54.5734 | 4.5000 | 58.82 | 1.518230 | 0.5449 | |
| 19 | −47.3825 | 4.5000 | | | | |
| 20 | 0.0000 | 0.5000 | | | | |
| 21 | 63.6526 | 3.8251 | 36.40 | 1.620040 | 0.5878 | |

TABLE 8-continued

Second example

| 22 | −67.1997 | 1.2000 | 82.57 | 1.497820 | 0.5386 |
|---|---|---|---|---|---|
| 23 | 38.7110 | 3.0000 | | | |
| 24 | −104.6546 | 1.5000 | 67.90 | 1.593190 | 0.544 |
| 25 | 57.0672 | 5.0000 | | | |
| 26 | 36.2961 | 8.4742 | 41.51 | 1.575010 | 0.5765 |
| 27 | −29.7475 | 4.0000 | 82.57 | 1.497820 | 0.5386 |
| 28 | −944.5222 | 9.8861 | | | |
| 29 | −43.9902 | 2.0000 | 46.59 | 1.816000 | 0.5567 |
| 30 | 36.4672 | 4.9460 | 44.46 | 1.612660 | 0.564 |
| 31 | −108.4507 | 0.5000 | | | |
| 32 | 69.7069 | 8.3459 | 40.98 | 1.581440 | 0.5763 |
| 33 | −27.7792 | 2.0000 | 22.74 | 1.808090 | 0.6288 |
| 34 | −105.8102 | BF | | | |
| Image plane | ∞ | | | | |

[Focal length of lens groups]

| Lens group | First surface | Focal length |
|---|---|---|
| First lens group | 1 | 158.7 |
| Second lens group | 13 | −166.5 |
| Third lens group | 16 | −108.5 |

In the optical system OL2, the eighth surface is the diffractive optical surface. Table 9 below shows data on the diffractive optical surface.

TABLE 9

[Data on diffractive optical surface]

| m | λ0 | n | C2 | C4 |
|---|---|---|---|---|
| 8 | 587.6 | 1.0 | −4.25304E−05 | 3.00000E−10 |

Further, in the optical system OL2, the on-axis air gap D1 between the first lens group G1 and the second lens group G2, the on-axis air gap D2 between the second lens group G2 and the third lens group G3, and the back focal length BF change at the time of focusing. Table 10 below shows variable gaps in the infinity focus state, the intermediate distance focus state, and the short distance focus state.

TABLE 10

[Variable distance data]

| State of focusing | Infinity | Middle distance | Close distance |
|---|---|---|---|
| f | 489.70405 | — | — |
| β | — | −0.03333 | −0.18012 |
| D0 | ∞ | 14704.2290 | 2720.0000 |
| D1 | 22.24696 | 25.12411 | 39.16215 |
| D2 | 32.25305 | 29.35590 | 15.39786 |
| BF | 64.39657 | 64.40466 | 64.43514 |

Table 11 below shows values satisfying the conditions in the optical system OL2.

TABLE 11 fpf = 11756.3
[Values compliant to conditional expressions]

(12) f1/fpf = 0.012

As described above, the optical system OL2 satisfies Conditional Expression (12) described above.

Figure 12:
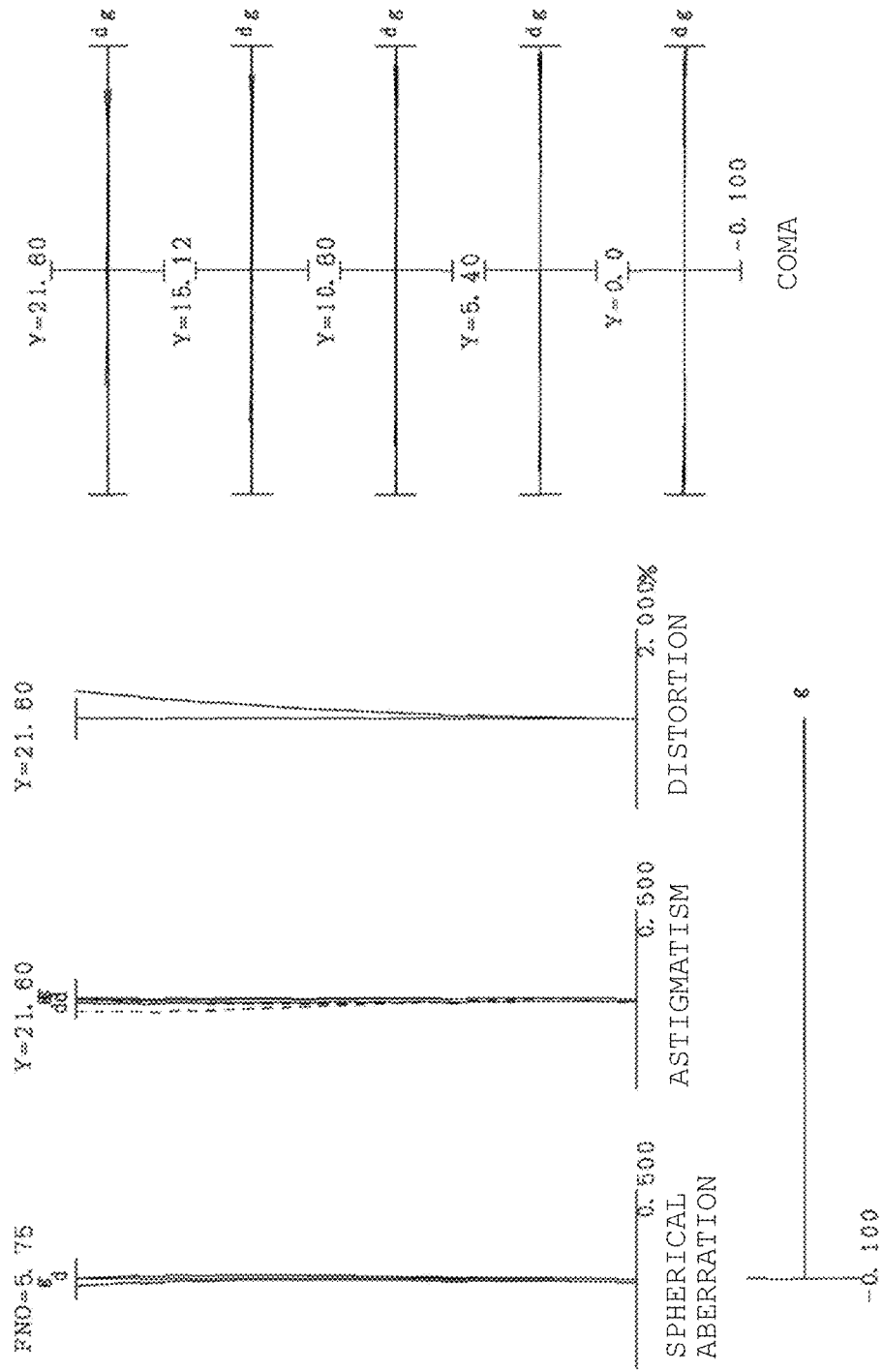
FIG. 12 shows a variety of aberrations of the optical system according to the second example in the infinity focus state.

FIG. 12 includes a spherical aberration diagram, an astigmatism diagram, a distortion diagram, a lateral chromatic aberration diagram, and a coma diagram in the infinity focus state of the optical system OL2. The aberration diagrams show that the variety of aberrations of the optical system OL2 are corrected in a satisfactory manner over the range from the infinity focus state to the short-distance focus state.

Third Example of Optical System

Figure 13:
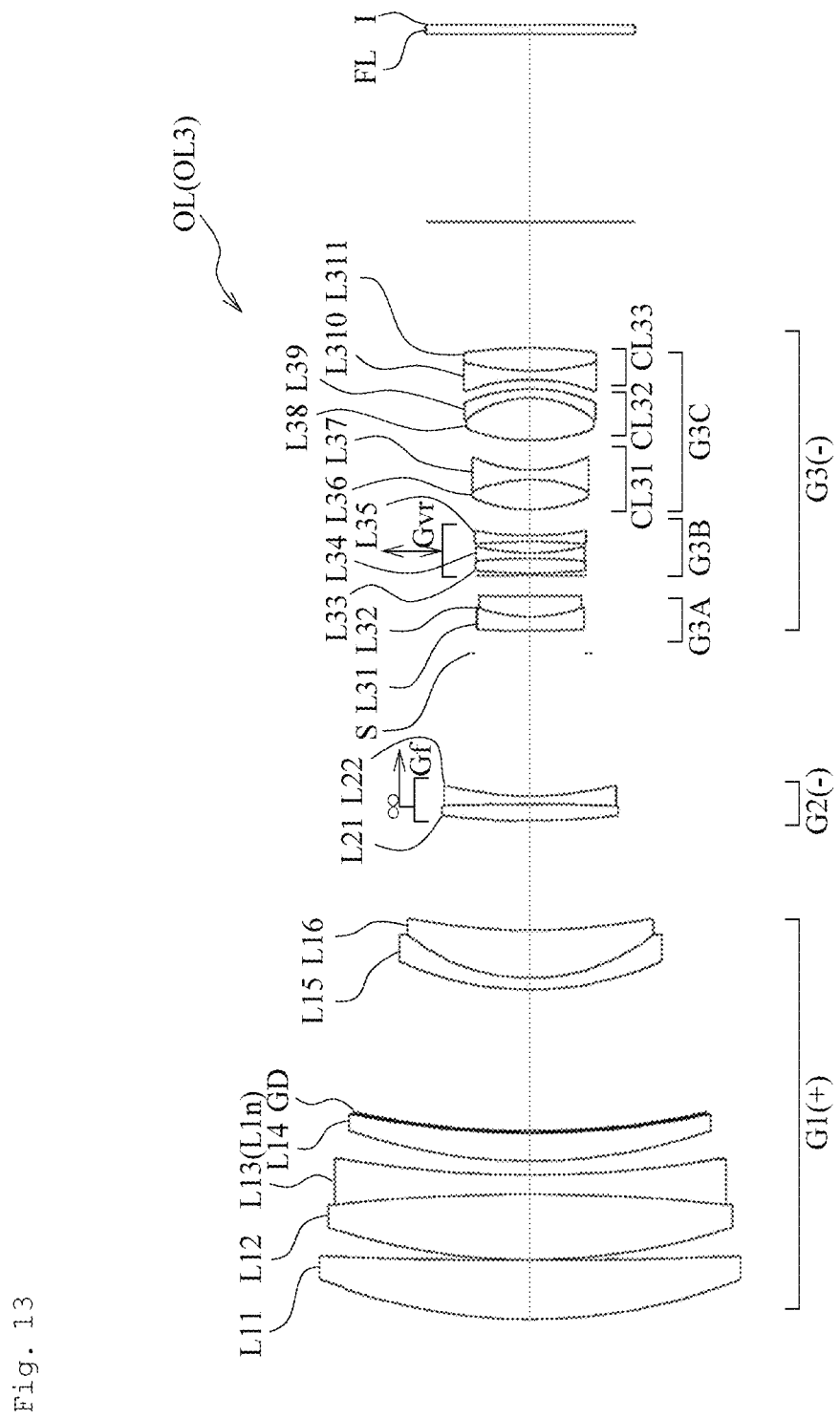
FIG. 13 is a cross-sectional view showing the lens configuration of an optical system according to a third example in the infinity focus state.

FIG. 13 shows the configuration of the optical system OL3 according to a third example. The optical system OL3 includes the following components sequentially arranged from the object side: a first lens group G1 having positive refracting power; a second lens group G2 having negative refracting power; an aperture stop S; and a third lens group G3 having negative refracting power, and the second lens group G2 is moved along the optical axis to serve as a focusing lens group Gf for focusing.

The first lens group G1 is formed of the following lenses sequentially arranged from the object side: a positive meniscus lens L11 having a convex surface facing the object side: a cemented positive lens formed of a biconvex positive lens L12 and a biconcave negative lens L13 cemented to each other; a positive meniscus lens L14 having a concave surface facing the image side with the intimate-contact-multiplayer diffractive optical element GD using two types of different materials and formed on the concave surface; and a cemented positive lens formed of a negative meniscus lens L15 having a convex surface facing the object side and a positive meniscus lens L16 having a convex surface facing the object side with the lenses L15 and L16 cemented to each other. The second lens group G2 is formed of a cemented negative lens formed of a biconvex positive lens L21 and a biconcave negative lens L22 sequentially arranged from the object side and cemented to each other. The third lens group G3 is formed of the following lenses sequentially arranged from the object side: a cemented negative lens formed of a negative meniscus lens L31 having a convex surface facing the object side and a biconvex positive lens L32 cemented to each other; a cemented negative lens formed of a biconvex positive lens L33 and a biconcave negative lens L34 cemented to each other; a biconcave negative lens L35; a cemented positive lens CL31 formed of a biconvex positive lens L36 and a biconcave negative lens L37 cemented to each other; a cemented positive lens CL32 formed of a biconvex positive lens L38 and a negative meniscus lens L39 having a concave surface facing the object side with the lenses L38 and L39 cemented to each other; and a cemented negative lens CL33 formed of a biconcave negative lens L310 and a biconvex positive lens L311 cemented to each other. A filter FL is disposed between the third lens group G3 and the image plane I. In the lens data shown in (Table 12), the twentieth surface represents an imaginary surface.

The optical system OL3 according to the third example is so configured that the cemented negative lens formed of the biconvex positive lens L33 and the biconcave negative lens L34 cemented to each other and the biconcave negative lens L35 in the third lens group G3 form an antivibration group Gvr, and that the antivibration group Gvr is so moved as to be displaced in the directions perpendicular to the optical axis to correct a change in the image position resulting, for example, from vibration of the optical system OL3.

Table 12 below shows values of the variety of parameters of the optical system OL3.

TABLE 12

Third example

[Overall Parameters]

| | |
|---|---|
| f = | 489.60699 |
| FNo = | 5.77358 |
| ω = | 2.50102 |
| TL = | 280.00477 |

[Lens data]

| m | r | d | νd | nd | θgF |
|---|---|---|---|---|---|
| Object plane | ∞ | | | | |
| 1 | 122.9476 | 12.8000 | 70.32 | 1.487490 | 0.5291 |
| 2 | 1170.7859 | 0.1000 | | | |
| 3 | 138.4197 | 14.2000 | 70.32 | 1.487490 | 0.5291 |
| 4 | −404.2440 | 4.2000 | 44.46 | 1.612660 | 0.564 |
| 5 | 239.1102 | 3.0000 | | | |
| 6 | 119.7261 | 6.0000 | 64.13 | 1.516800 | 0.5356 |
| 7 | 182.0193 | 0.2000 | 33.36 | 1.527800 | 0.6291 |
| 8* | 182.0193 | 0.3000 | 49.98 | 1.557147 | 0.5688 |
| 9 | 182.0193 | 30.5473 | | | |
| 10 | 68.0810 | 2.5000 | 40.66 | 1.883000 | 0.5668 |
| 11 | 42.3028 | 10.3591 | 70.32 | 1.487490 | 0.5291 |
| 12 | 139.6949 | D1 | | | |
| 13 | 160.1874 | 3.5000 | 31.16 | 1.688930 | 0.5993 |
| 14 | −763.1227 | 1.8000 | 49.26 | 1.743200 | 0.5526 |
| 15 | 72.3797 | D2 | | | |
| 16 | 0.0000 | 4.6833 | | | S |
| 17 | 184.5427 | 3.0000 | 35.72 | 1.902650 | 0.5804 |
| 18 | 32.0345 | 4.5000 | 46.48 | 1.582670 | 0.5663 |
| 19 | −1347.5920 | 4.5000 | | | |
| 20 | 0.0000 | 0.5000 | | | |
| 21 | 108.6182 | 3.2000 | 33.72 | 1.647690 | 0.593 |
| 22 | −132.3745 | 1.2000 | 70.32 | 1.487490 | 0.5291 |
| 23 | 51.5472 | 2.4500 | | | |
| 24 | −139.0671 | 1.3000 | 67.90 | 1.593190 | 0.544 |
| 25 | 71.8302 | 5.5639 | | | |
| 26 | 30.9587 | 6.5741 | 44.46 | 1.612660 | 0.564 |
| 27 | −29.7499 | 2.0000 | 67.90 | 1.593190 | 0.544 |
| 28 | 27.3446 | 6.3892 | | | |
| 29 | 38.2118 | 9.2060 | 40.98 | 1.581440 | 0.5763 |
| 30 | −22.9829 | 2.0000 | 22.74 | 1.808090 | 0.6287 |
| 31 | −33.7014 | 1.9429 | | | |
| 32 | −39.4851 | 2.0000 | 40.66 | 1.883000 | 0.5668 |
| 33 | 57.7841 | 4.8763 | 44.46 | 1.612660 | 0.564 |
| 34 | −105.7143 | 27.2264 | | | |
| 35 | 0.0000 | 40.5814 | | | |
| 36 | 0.0000 | 2.0000 | 63.88 | 1.516800 | 0.536 |
| 37 | 0.0000 | BF | | | |
| Image plane | ∞ | | | | |

[Focal length of lens groups]

| Lens group | First surface | Focal length |
|---|---|---|
| First lens group | 1 | 156.0 |
| Second lens group | 13 | −169.5 |
| Third lens group | 16 | −102.5 |

In the optical system OL3, the eighth surface is the diffractive optical surface. Table 13 below shows data on the diffractive optical surface.

TABLE 13

[Data on diffractive optical surface]

| m | λ0 | n | C2 | C4 |
|---|---|---|---|---|
| 8 | 587.6 | 1.0 | −4.00000E−05 | 3.00000E−10 |

Further, in the optical system OL3, the on-axis air gap D1 between the first lens group G1 and the second lens group G2, the on-axis air gap D2 between the second lens group G2 and the third lens group G3, and the back focal length BF change at the time of focusing. Table 14 below shows variable gaps in the infinity focus state, the intermediate distance focus state, and the short distance focus state.

TABLE 14

[Variable distance data]

| State of focusing | Infinity | Middle distance | Close distance |
|---|---|---|---|
| f | 489.60699 | — | — |
| β | — | −0.03333 | −0.17907 |
| D0 | ∞ | 14688.0010 | 2720.0000 |
| D1 | 23.65867 | 26.53105 | 40.54928 |
| D2 | 31.04134 | 28.15895 | 14.21073 |
| BF | 0.10477 | 0.11361 | 0.14305 |

Table 15 below shows values satisfying the conditions in the optical system OL3.

TABLE 15 fpf = 12500.0

[Values compliant to conditional expressions]

(12) f1/fpf = 0.014

As described above, the optical system OL3 satisfies Conditional Expression (12) described above.

Figure 14:
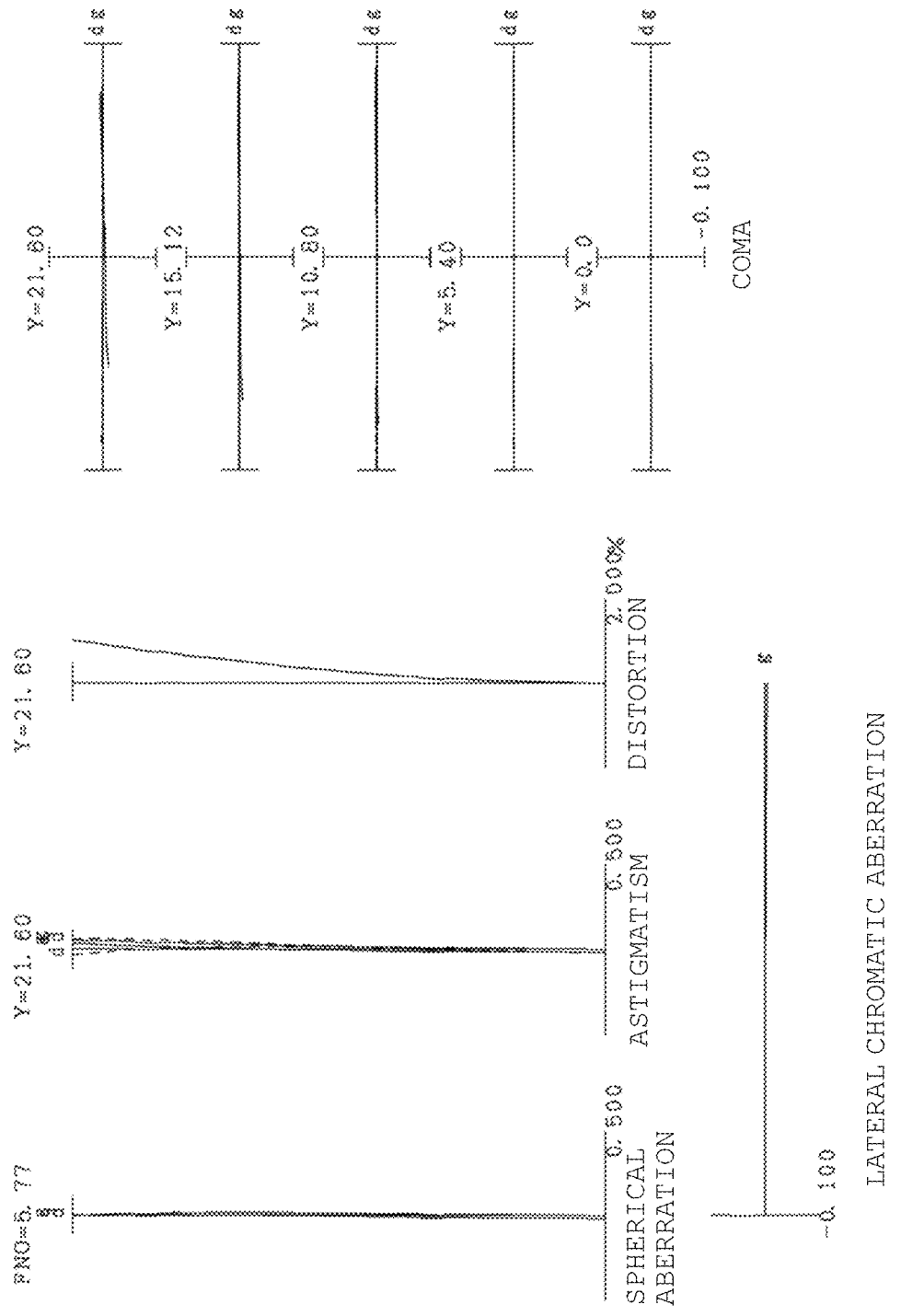
FIG. 14 shows a variety of aberrations of the optical system according to the third example in the infinity focus state.

FIG. 14 includes a spherical aberration diagram, an astigmatism diagram, a distortion diagram, a lateral chromatic aberration diagram, and a coma diagram in the infinity focus state of the optical system OL3. The aberration diagrams show that the variety of aberrations of the optical system OL3 are corrected in a satisfactory manner over the range from the infinity focus state to the short-distance focus state.

Fourth Example of Optical System

Figure 15:
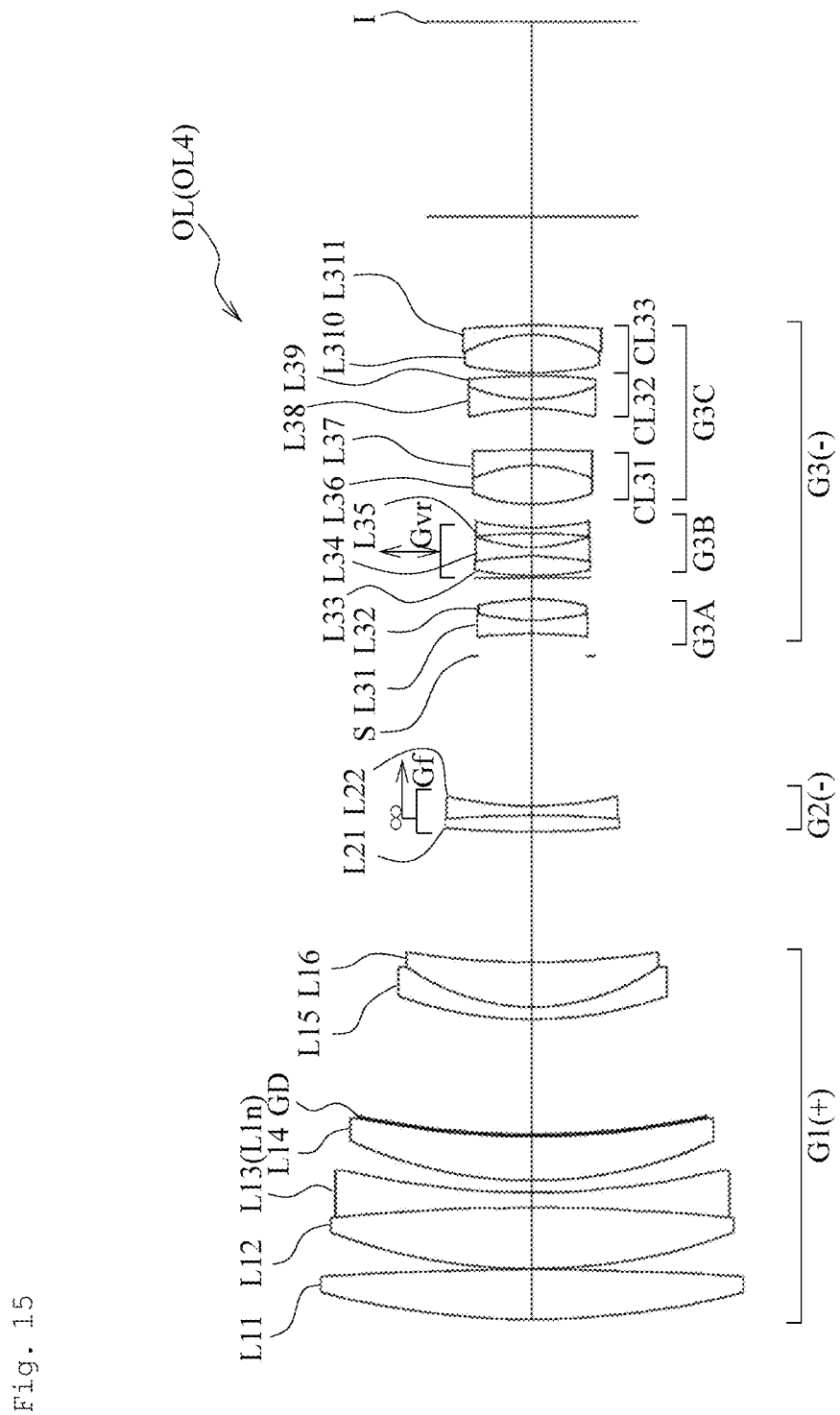
FIG. 15 is a cross-sectional view showing the lens configuration of an optical system according to a fourth example in the infinity focus state.

FIG. 15 shows the configuration of the optical system OL4 according to a fourth example. The optical system OL4 includes the following components sequentially arranged from the object side: a first lens group G1 having positive refracting power; a second lens group G2 having negative refracting power; an aperture stop S; and a third lens group G3 having negative refracting power, and the second lens group G2 is moved along the optical axis to serve as a focusing lens group Gf for focusing.

The first lens group G1 is formed of the following lenses sequentially arranged from the object side: a biconvex positive lens L11; a cemented positive lens formed of a biconvex positive lens L12 and a biconcave negative lens L13 cemented to each other; a positive meniscus lens L14 having a concave surface facing the image side with the intimate-contact-multiplayer diffractive optical element GD using two types of different materials and formed on the concave surface; and a cemented negative lens formed of a negative meniscus lens L15 having a convex surface facing the object side and a positive meniscus lens L16 having a convex surface facing the object side with the lenses L15 and L16 cemented to each other. The second lens group G2 is formed of a cemented negative lens formed of a biconvex positive lens L21 and a biconcave negative lens L22 sequentially arranged from the object side and cemented to each other. The third lens group G3 is formed of the following lenses sequentially arranged from the object side: a cemented negative lens formed of a biconcave negative lens L31 and a biconvex positive lens L32 cemented to each other; a cemented negative lens formed of a biconvex positive lens L33 and a biconcave negative lens L34 cemented to each other; a biconcave negative lens L35; a cemented positive lens formed of a biconvex positive lens L36 and a negative meniscus lens L37 having a concave surface facing the object side with the lenses L36 and L37 cemented to each other; a cemented negative lens formed of a biconcave negative lens L38 and a biconvex positive lens L39 cemented to each other; and a cemented positive lens formed of a biconvex positive lens L310 and a negative meniscus lens L311 having a concave surface facing the object side with the lenses L310 and L311 cemented to each other. In the lens data shown in (Table 16), the twentieth surface represents an imaginary surface.

The optical system OL4 according to the fourth example is so configured that the cemented negative lens formed of the biconvex positive lens L33 and the biconcave negative lens L34 cemented to each other and the biconcave negative lens L35 in the third lens group G3 form an antivibration group Gvr, and that the antivibration group Gvr is so moved as to be displaced in the directions perpendicular to the optical axis to correct a change in the image position resulting, for example, from vibration of the optical system OL4.

Table 16 below shows values of the variety of parameters of the optical system OL4.

TABLE 16

Fourth example

[Overall Parameters]

| | |
|---|---|
| f = | 489.86648 |
| FNo = | 5.88304 |
| ω = | 2.51193 |
| TL = | 279.31858 |

[Lens data]

| m | r | d | νd | nd | θgF |
|---|---|---|---|---|---|
| Object plane | ∞ | | | | |
| 1 | 177.9322 | 10.7424 | 70.31 | 1.487490 | 0.5291 |
| 2 | −684.2028 | 0.1000 | | | |
| 3 | 122.4566 | 13.2172 | 70.31 | 1.487490 | 0.5291 |
| 4 | −434.8886 | 3.3400 | 44.46 | 1.612660 | 0.564 |
| 5 | 175.1561 | 2.5000 | | | |
| 6 | 93.5593 | 9.5000 | 64.13 | 1.516800 | 0.5356 |
| 7 | 182.0193 | 0.2000 | 33.41 | 1.527800 | 0.6329 |
| 8* | 182.0193 | 0.3000 | 49.74 | 1.557100 | 0.5625 |
| 9 | 182.0193 | 24.6299 | | | |
| 10 | 85.2289 | 2.7000 | 40.66 | 1.883000 | 0.5669 |
| 11 | 46.6951 | 9.6422 | 70.31 | 1.487490 | 0.5291 |
| 12 | 167.4939 | D1 | | | |
| 13 | 213.7194 | 3.5000 | 33.73 | 1.647690 | 0.5931 |
| 14 | −215.1271 | 2.0000 | 50.27 | 1.719990 | 0.5527 |
| 15 | 81.1151 | D2 | | | |
| 16 | 0.0000 | 4.6833 | | | S |
| 17 | −108.6991 | 3.0000 | 46.59 | 1.816000 | 0.5567 |
| 18 | 51.7879 | 4.5000 | 58.82 | 1.518230 | 0.5449 |
| 19 | −47.3380 | 4.5000 | | | |
| 20 | 0.0000 | 0.5000 | | | |
| 21 | 58.5515 | 4.1845 | 36.40 | 1.620040 | 0.5878 |
| 22 | −71.0652 | 2.0000 | 82.57 | 1.497820 | 0.5386 |
| 23 | 34.7292 | 3.0000 | | | |
| 24 | −96.6917 | 1.2000 | 67.90 | 1.593190 | 0.544 |
| 25 | 57.7620 | 5.0000 | | | |
| 26 | 36.6409 | 8.3877 | 41.51 | 1.575010 | 0.5765 |
| 27 | −29.6683 | 3.2259 | 82.57 | 1.497820 | 0.5386 |
| 28 | −506.0649 | 8.9942 | | | |
| 29 | −47.7973 | 2.0000 | 46.59 | 1.816000 | 0.5567 |
| 30 | 34.9739 | 5.0330 | 44.46 | 1.612660 | 0.564 |
| 31 | −108.0742 | 0.6389 | | | |

TABLE 16-continued

Fourth example

| | | | | | |
|---|---|---|---|---|---|
| 32 | 61.8976 | 8.2352 | 40.98 | 1.581440 | 0.5763 |
| 33 | −29.6045 | 2.0000 | 22.74 | 1.808090 | 0.6288 |
| 34 | −156.7818 | 23.3642 | | | |
| 35 | 0.0000 | BF | | | |
| Image plane | ∞ | | | | |

[Focal length of lens groups]

| Lens group | First surface | Focal lenth |
|---|---|---|
| First lens group | 1 | 160.3 |
| Second lens group | 13 | −164.1 |
| Third lens group | 16 | −111.5 |

In the optical system OL4, the eighth surface is the diffractive optical surface. Table 17 below shows data on the diffractive optical surface.

TABLE 17

[Data on diffractive optical surface]

| m | λ0 | n | C2 | C4 |
|---|---|---|---|---|
| 8 | 587.6 | 1.0 | −4.06169E−05 | 3.00000E−10 |

Further, in the optical system OL4, the on-axis air gap D1 between the first lens group G1 and the second lens group G2, the on-axis air gap D2 between the second lens group G2 and the third lens group G3, and the back focal length BF change at the time of focusing. Table 18 below shows variable gaps in the infinity focus state, the intermediate distance focus state, and the short distance focus state.

TABLE 18

[Variable distance data]

| State of focusing | Infinity | Middle distance | Close distance |
|---|---|---|---|
| f | 489.86648 | — | — |
| β | — | −0.03333 | −0.18008 |
| D0 | ∞ | 14707.6860 | 2720.0000 |
| D1 | 28.11673 | 30.99524 | 45.01048 |
| D2 | 32.38327 | 29.48476 | 15.54952 |
| BF | 42.00002 | 42.00002 | 42.00002 |

Table 19 below shows values satisfying the conditions in the optical system OL4.

TABLE 19 fpf = 12310.1

[Values compliant to conditional expressions]

(12) f1/fpf = 0.013

As described above, the optical system OL4 satisfies Conditional Expression (12) described above.

Figure 16:
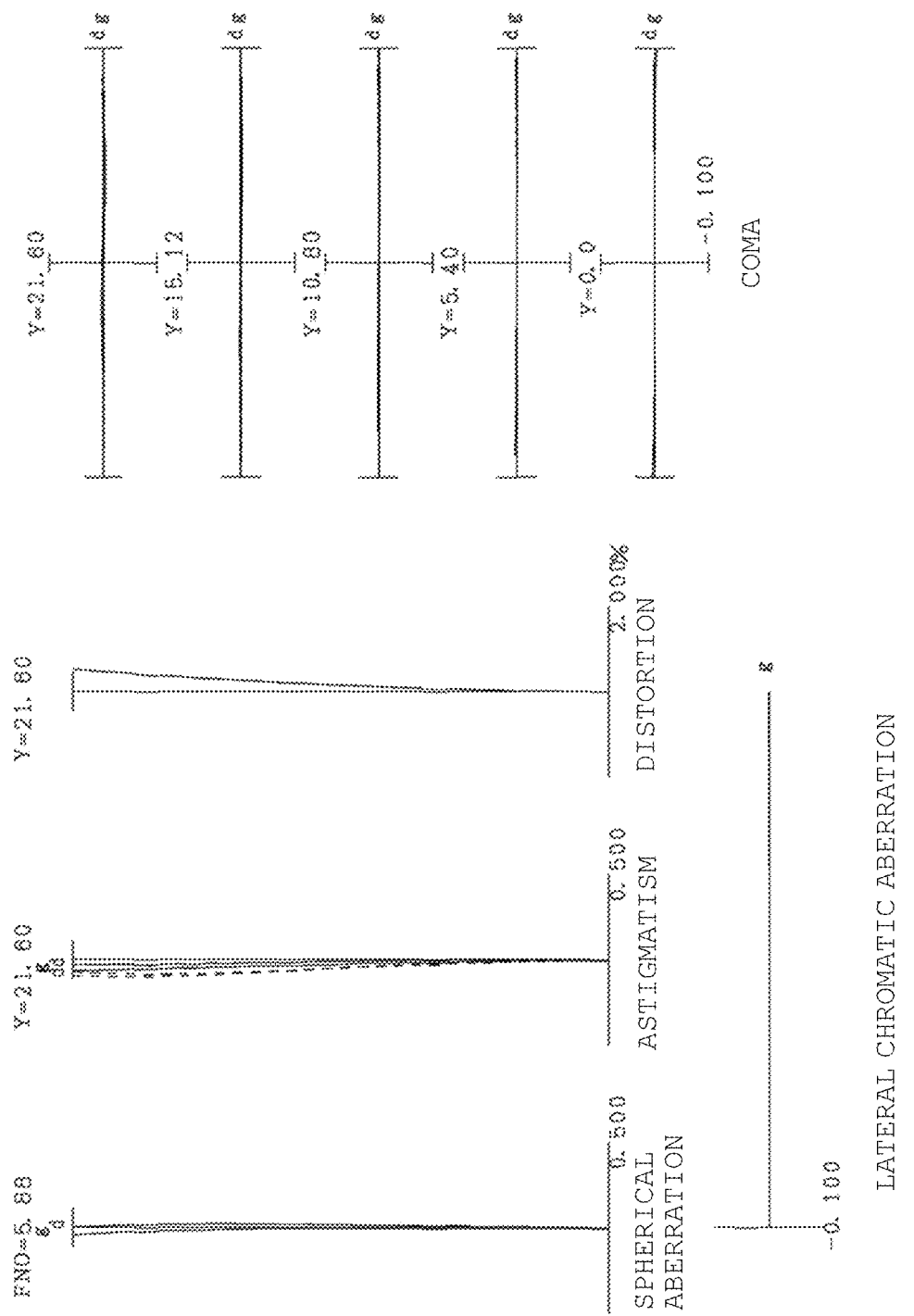
FIG. 16 shows a variety of aberrations of the optical system according to the fourth example in the infinity focus state.

FIG. 16 includes a spherical aberration diagram, an astigmatism diagram, a distortion diagram, a lateral chromatic aberration diagram, and a coma diagram in the infinity focus state of the optical system OL4. The aberration diagrams show that the variety of aberrations of the optical system OL4 are corrected in a satisfactory manner over the range from the infinity focus state to the short-distance focus state.

Fifth Example of Optical System

Figure 17:
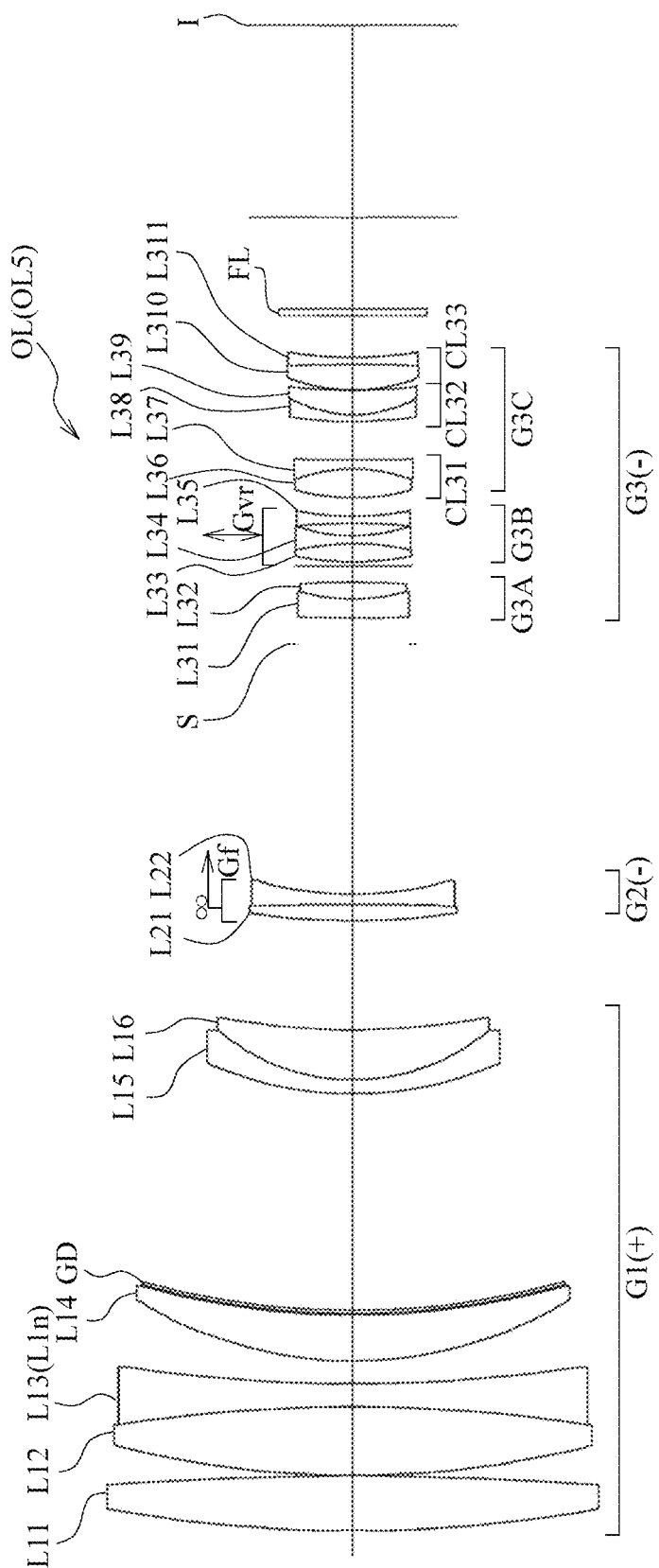
FIG. 17 is a cross-sectional view showing the lens configuration of an optical system according to a fifth example in the infinity focus state.

FIG. 17 shows the configuration of the optical system OL5 according to a fifth example. The optical system OL5 includes the following components sequentially arranged from the object side: a first lens group G1 having positive refracting power; a second lens group G2 having negative refracting power; an aperture stop S; and a third lens group G3 having negative refracting power, and the second lens group G2 is moved along the optical axis to serve as a focusing lens group Gf for focusing.

The first lens group G1 is formed of the following lenses sequentially arranged from the object side: a biconvex positive lens L11; a cemented positive lens formed of a biconvex positive lens L12 and a biconcave negative lens L13 cemented to each other; a positive meniscus lens L14 having a concave surface facing the image side with the intimate-contact-multiplayer diffractive optical element GD using two types of different materials and formed on the concave surface; and a cemented negative lens formed of a negative meniscus lens L15 having a convex surface facing the object side and a positive meniscus lens L16 having a convex surface facing the object side with the lenses L15 and L16 cemented to each other. The second lens group G2 is formed of a cemented negative lens formed of a biconvex positive lens L21 and a biconcave negative lens L22 sequentially arranged from the object side and cemented to each other. The third lens group G3 is formed of the following lenses sequentially arranged from the object side: a cemented negative lens formed of a negative meniscus lens L31 having a convex surface facing the object side and a biconvex positive lens L32 cemented to each other; a cemented negative lens formed of a biconvex positive lens L33 and a biconcave negative lens L34 cemented to each other; a biconcave negative lens L35; a cemented positive lens CL31 formed of a biconvex positive lens L36 and a biconcave negative lens L37 cemented to each other; a cemented negative lens CL32 formed of a negative meniscus lens L38 having a convex surface facing the object side and a positive meniscus lens L39 having a concave surface facing the object side with the lenses L38 and L39 cemented to each other; and a cemented positive lens CL33 formed of a biconvex positive lens L310 and a biconcave negative lens L311 cemented to each other. In the lens data shown in (Table 20), the twentieth surface represents an imaginary surface.

The optical system OL5 according to the fifth example is so configured that the cemented negative lens formed of the biconvex positive lens L33 and the biconcave negative lens L34 cemented to each other and the biconcave negative lens L35 in the third lens group G3 form an antivibration group Gvr, and that the antivibration group Gvr is so moved as to be displaced in the directions perpendicular to the optical axis to correct a change in the image position resulting, for example, from vibration of the optical system OL5.

Table 20 below shows values of the variety of parameters of the optical system OL5.

TABLE 20

Fifth example

[Overall Parameters]

| | |
|---|---|
| f = | 587.82207 |
| FNo = | 5.88304 |
| ω = | 2.51193 |
| TL = | 334.33637 |

TABLE 20-continued

Fifth example

[Lens data]

| m | r | d | vd | nd | θgF |
|---|---|---|---|---|---|
| Object plane | ∞ | | | | |
| 1 | 302.4929 | 12.0000 | 70.32 | 1.487490 | 0.5291 |
| 2 | −715.9215 | 0.1000 | | | |
| 3 | 210.7157 | 15.0000 | 70.32 | 1.487490 | 0.5291 |
| 4 | −342.1326 | 5.0000 | 44.46 | 1.612660 | 0.564 |
| 5 | 333.1726 | 5.0000 | | | |
| 6 | 90.8030 | 10.0000 | 63.88 | 1.516800 | 0.536 |
| 7 | 171.8616 | 0.4000 | 33.36 | 1.527800 | 0.6291 |
| 8* | 171.8616 | 0.6000 | 49.98 | 1.557147 | 0.5688 |
| 9 | 171.8616 | 47.3894 | | | |
| 10 | 80.6830 | 3.0000 | 40.66 | 1.883000 | 0.5668 |
| 11 | 45.9758 | 11.0000 | 70.32 | 1.487490 | 0.5291 |
| 12 | 158.1668 | D1 | | | |
| 13 | 163.1229 | 3.5000 | 33.72 | 1.647690 | 0.593 |
| 14 | −678.8737 | 2.2000 | 50.27 | 1.719990 | 0.5527 |
| 15 | 75.9479 | D2 | | | |
| 16 | 0.0000 | 5.6200 | | | S |
| 17 | 227.5523 | 4.2000 | 46.59 | 1.816000 | 0.5567 |
| 18 | 43.5080 | 3.6503 | 58.82 | 1.518230 | 0.5449 |
| 19 | −176.3202 | 3.5000 | | | |
| 20 | 0.0000 | 0.9168 | | | |
| 21 | 62.2833 | 4.0000 | 36.40 | 1.620040 | 0.5878 |
| 22 | −55.1599 | 1.7000 | 67.90 | 1.593190 | 0.544 |
| 23 | 38.1756 | 2.6955 | | | |
| 24 | −129.4541 | 1.6000 | 67.90 | 1.593190 | 0.544 |
| 25 | 62.2355 | 4.0000 | | | |
| 26 | 47.1782 | 6.3136 | 40.98 | 1.581440 | 0.5763 |
| 27 | −35.5372 | 2.0000 | 67.90 | 1.593190 | 0.544 |
| 28 | 939.6807 | 8.3679 | | | |
| 29 | 99.9008 | 1.5000 | 40.66 | 1.883000 | 0.5668 |
| 30 | 28.0287 | 5.3178 | 44.46 | 1.612660 | 0.564 |
| 31 | 118.6519 | 0.1000 | | | |
| 32 | 39.8576 | 5.5971 | 36.40 | 1.620040 | 0.5878 |
| 33 | −253.7914 | 1.5000 | 20.88 | 1.922860 | 0.639 |
| 34 | 92.8638 | 9.0000 | | | |
| 35 | 0.0000 | 1.5000 | 63.88 | 1.516800 | 0.536 |
| 36 | 0.0000 | 20.0000 | | | |
| 37 | 0.0000 | BF | | | |
| Image plane | ∞ | | | | |

[Focal length of lens groups]

| Lens group | First surface | Focal length |
|---|---|---|
| First lens group | 1 | 195.3 |
| Second lens group | 13 | −182.2 |
| Third lens group | 16 | −121.3 |

In the optical system OL5, the eighth surface is the diffractive optical surface. Table 21 below shows data on the diffractive optical surface.

TABLE 21

[Data on diffractive optical surface]

| m | λ0 | n | C2 | C4 |
|---|---|---|---|---|
| 8 | 587.6 | 1.0 | −3.15496E−05 | 1.94872E−10 |

Further, in the optical system OL5, the on-axis air gap D1 between the first lens group G1 and the second lens group G2, the on-axis air gap D2 between the second lens group G2 and the third lens group G3, and the back focal length BF change at the time of focusing. Table 22 below shows variable gaps in the infinity focus state, the intermediate distance focus state, and the short distance focus state.

TABLE 22

[Variable distance data]

| State of focusing | Infinity | Middle distance | Close distance |
|---|---|---|---|
| f | 587.82207 | — | — |
| β | — | −0.03333 | −0.17715 |
| D0 | ∞ | 17647.0010 | 3314.9820 |
| D1 | 23.85485 | 27.17253 | 42.96010 |
| D2 | 54.71307 | 51.39539 | 35.60782 |
| BF | 42.00000 | 41.99968 | 41.99993 |

Table 23 below shows values satisfying the conditions in the optical system OL5.

TABLE 23 fpf = 15848.1
[Values compliant to conditional expressions]

(12) f1/fpf = 0.012

As described above, the optical system OL5 satisfies Conditional Expression (12) described above.

Figure 18:
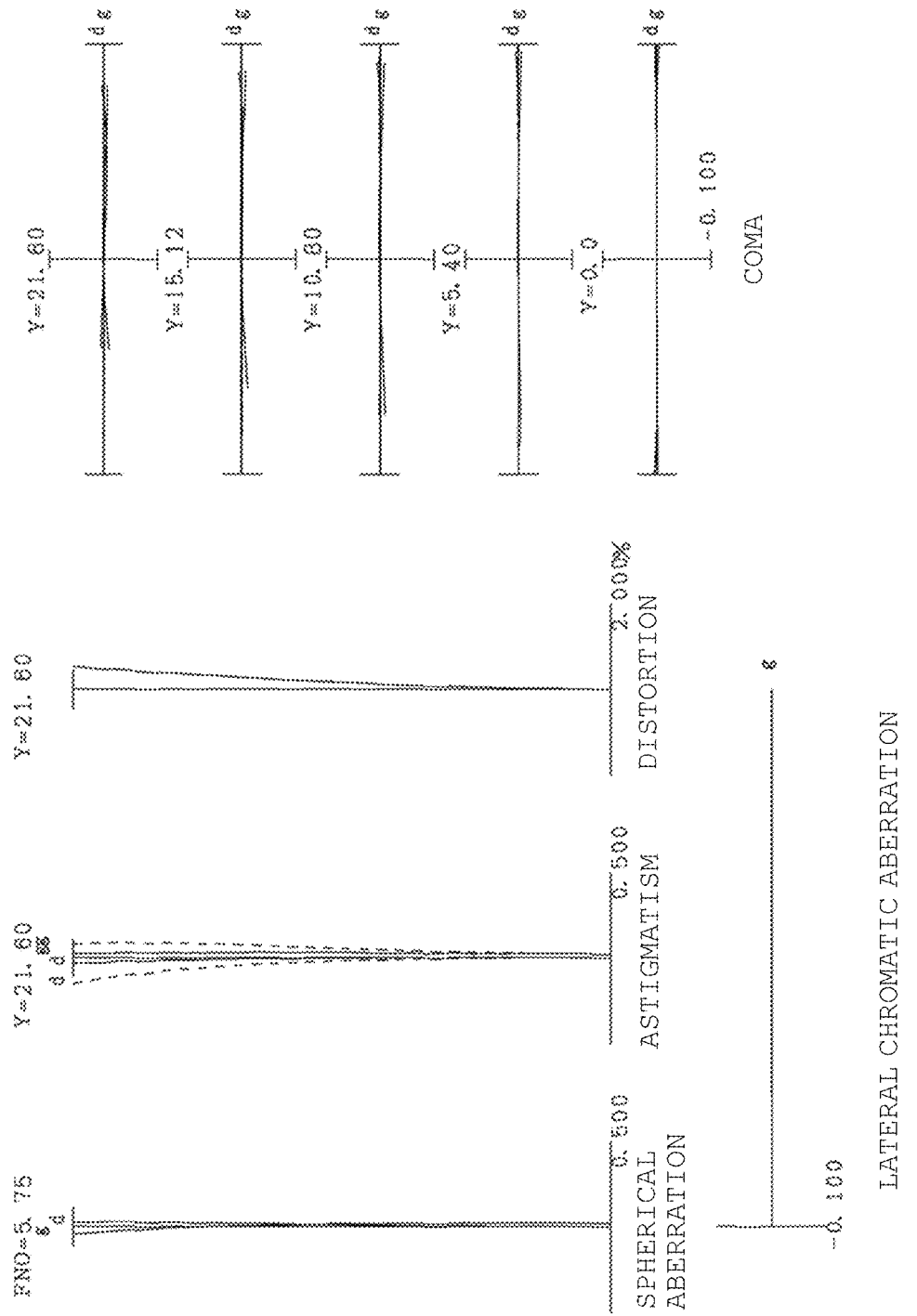
FIG. 18 shows a variety of aberrations of the optical system according to the fifth example in the infinity focus state.

FIG. 18 includes a spherical aberration diagram, an astigmatism diagram, a distortion diagram, a lateral chromatic aberration diagram, and a coma diagram in the infinity focus state of the optical system OL5. The aberration diagrams show that the variety of aberrations of the optical system OL5 are corrected in a satisfactory manner over the range from the infinity focus state to the short-distance focus state.

The contents described below are employable as appropriate to the extent that the contents cause no deterioration of the optical performance.

In the examples described above, the optical system OL having a three-group configuration has been presented, and the configuration conditions and other factors described above are also applicable to a four-group configuration, a five-group configuration, and other group configurations. A configuration in which a lens or a lens group is added in a position closest to the object side or a configuration in which a lens or a lens group is added in a position closest to the image plane side may be employed. Specifically, it is conceivable to employ a configuration in which a lens group fixed in terms of position relative to the image plane at the time of magnification change or focusing is added in a position closest to the image plane side. The lens group refers to a portion including at least one or more lenses separate from each other by an air gap that changes at the time of magnification change or focusing. A lens component refers to a single lens or a cemented lens formed of a plurality of lenses cemented to each other.

A single lens group, a plurality of lens groups, or a partial lens group may be moved along the optical axis to serve as a focusing group that allows focusing of an object movable over the range from infinity to a short distance. In this case, the focusing group can also be used in autofocusing and is also suitable for autofocus motor driving (using ultrasonic motor or any other component). In particular, it is preferable that at least part of the second lens group G2 serves as the focusing group and the other lenses are fixed in positions relative to the image plane at the time of focusing. In consideration of the load acting on the motor, the focusing lens group is preferably formed of a cemented lens and may instead be formed of a single lens.

A lens group or a partial lens group may be so moved as to be displaced in the directions perpendicular to the optical axis or rotated (swung) in the in-plane direction containing the optical axis to serve as an antivibration group that corrects image blur due to handshaking. In particular, at least part of the third lens group G3 is preferably configured to serve as the antivibration group.

A lens surface may be formed of a spherical surface or a flat surface or even an aspheric surface. In the case where a lens surface is a spherical or flat surface, the lens is readily processed, assembled, and adjusted, whereby degradation in the optical performance due to errors in the lens processing, assembly, and adjustment is preferably avoided. Further, even when the image plane is shifted, the amount of degradation in drawing performance is preferably small. In the case where the lens surface is an aspheric surface, the aspheric surface may be any of a ground aspheric surface, a glass molded aspheric surface that is a glass surface so molded in a die as to have an aspheric shape, and a composite aspheric surface that is a glass surface on which aspherically shaped resin is formed. The lens surface may instead be a diffractive optical surface, or any of the lenses may be a distributed index lens (GRIN lens) or a plastic lens.

The aperture stop S is preferably disposed in the vicinity of the third lens group G3 or in the third lens group G3. Instead, no member as the aperture stop may be provided, and the frame of a lens may serve as the aperture stop.

Further, each lens surface may be provided with an antireflection film having high transmittance over a wide wavelength range to achieve good optical performance that allows flare and ghost to be reduced and high contrast to be achieved.

Figure 19:
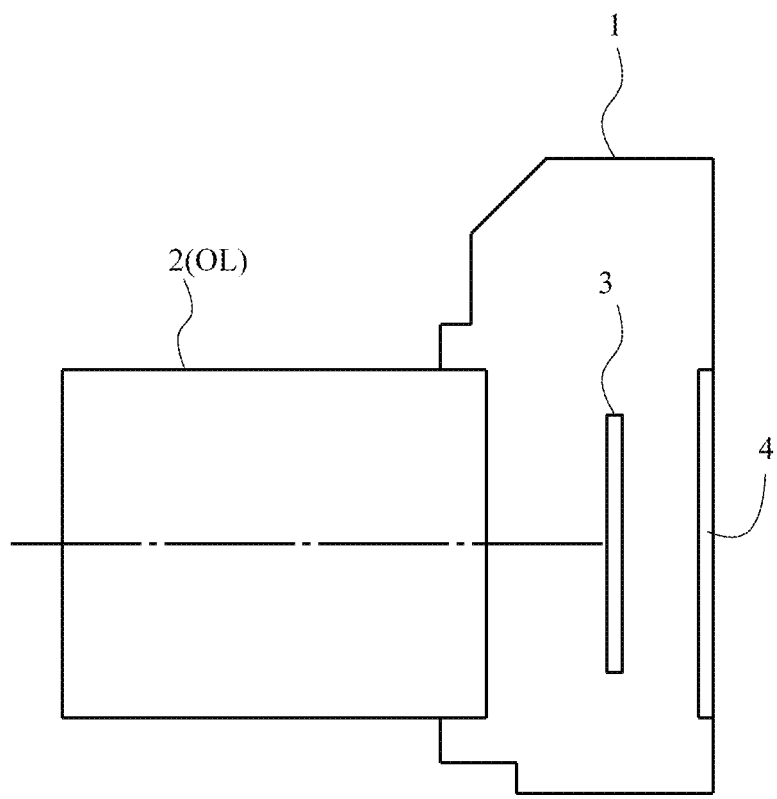
FIG. 19 is a cross-sectional view of a camera that incorporates the optical system described above.

A camera that is an optical apparatus including the optical system OL according to any of the embodiments of the present invention will next be described based on FIG. 19. A camera 1 is what is called a lens-interchangeable mirrorless camera including the optical system OL according to any of the embodiments of the present invention as an imaging lens 2. In the camera 1 according to the present invention, light from an object (subject) that is not shown is collected by the imaging lens 2 and forms a subject image on the imaging surface of an imaging section 3 via an optical low pass filter (OLPF) that is not shown. A photoelectric converter element provided in the imaging section 3 photoelectrically converts the subject image to produce an image of the subject. The image is displayed on an electronic view finder (EVF) 4 provided in the camera 1. A photographer who uses the camera 1 can thus view the subject via the EVF 4.

When the photographer presses a release button that is not shown, the image photoelectrically converted by the imaging section 3 is stored in a memory that is not shown. The photographer can thus capture an image of the subject by using the camera 1. The present embodiment has been described with reference to a mirrorless camera, and the same effects provided by the camera 1 described above can be provided even in a case where the optical system OL according to any of the embodiments of the present invention is incorporated in a single lens reflex camera that includes a quick-return mirror in the camera main body and allows the photographer to view a subject via a finder optical system.

REFERENCE SIGNS LIST

1: Camera (optical apparatus)
OL (OL1 to OL5): Optical system
G1: First lens group
G2: Second lens group
GD: Diffractive optical element

The invention claimed is:

1. A diffractive optical element comprising a diffraction grating so that the diffractive optical element serves as a lens,
   wherein a grating height of the diffraction grating in a central region around an optical axis is smaller than the grating height of the diffraction grating in a peripheral region, and
   conditions below are satisfied:

$0.50<rc<0.98$; and $0.01\%<\Delta h/h0<10.00\%$, where
   r: Normalized radius (quotient resulting from operation of dividing height from optical axis in direction perpendicular to optical axis by effective diameter),
   h0: Average of the grating heights of the diffraction grating over a range of $0.00<r<0.50$,
   hmax: Average of the grating heights of the diffraction grating over a range of $0.98<r<1.00$,
   $\Delta h$: Difference between hmax and h0, and
   rc: Normalized radius at which the grating height is (h0+hmax)/2.

2. The diffractive optical element according to claim 1, wherein the diffraction grating is a blazed diffraction grating.

3. A diffractive optical element comprising a diffraction grating so that the diffractive optical element serves as a lens,
   wherein a grating height of the diffraction grating in a central region around an optical axis is smaller than the grating height of the diffraction grating in a peripheral region,
   the grating height is h0 in the central region,
   the grating height is hmax in the peripheral region, and
   a condition below is satisfied $Se/(Sc+Sp) \leq 50\%$ where
   Sc: Area of the central region,
   Sp: Area of the peripheral region, and
   Se: Area of a region where the grating height is between the grating height h0 and the grating height hmax.

4. A diffractive optical element comprising a blazed diffraction grating so that the diffractive optical element serves as a lens,
   wherein the diffractive optical element has at least two regions that provide different diffraction efficiencies on a wavelength basis,
   the at least two regions have a central region that is a region around an optical axis and having a radius smaller than a predetermined normalized radius and a peripheral region that has a radius greater than the predetermined normalized radius, and
   conditions below are satisfied:

$E\_in<E\_out$;

$0.50<rs<0.98$;

$E\_in>90\%$; and $E\_out>90\%$, where
   rs: The predetermined normalized radius (quotient resulting from operation of dividing height from optical axis in direction perpendicular to optical axis by effective diameter),
   E_in: Diffraction efficiency of the diffraction grating in the central region at a C line, and
   E_out: Diffraction efficiency of the diffraction grating in the peripheral region at the C line.

5. The diffractive optical element according to claim 4, wherein a condition below is satisfied:

$F\_out/F\_in<0.50$ where
   F_in: Flare light ratio of the diffraction grating in the central region at C line, and
   F_out: Flare light ratio of the diffraction grating in the peripheral region at C line.

6. A diffractive optical element comprising a blazed diffraction grating so that the diffractive optical element serves as a lens,
   wherein the diffractive optical element has at least two regions that provide different diffraction efficiencies on a wavelength basis,
   the at least two regions have a central region that is a region around an optical axis and having a radius smaller than a predetermined normalized radius and a peripheral region that has a radius greater than the predetermined normalized radius, and
   conditions below are satisfied:

$W\_in<W\_out$;

$0.50<ra<0.98$; and $5\ nm<W\_out-W\_in<50\ nm$, where
   ra: The predetermined normalized radius (quotient resulting from operation of dividing height from optical axis in direction perpendicular to optical axis by effective diameter),
   W_in: Wavelength at which the diffraction efficiency is maximized in the diffraction grating in the central region, and
   W_out: Wavelength at which the diffraction efficiency is maximized in the diffraction grating in the peripheral region.

7. The diffractive optical element according to claim 1, wherein a design order is fixed across a region within an effective diameter, and
   the design order refers to a diffraction order for which intensity of diffracted light rays diffracted by the diffraction grating is maximized.

8. The diffractive optical element according to claim 1, wherein the diffractive optical element is made of two optical materials having different refractive indices, and the diffraction grating is formed along a boundary surface between the optical materials.

9. An optical system comprising the diffractive optical element according to claim 1.

10. An optical system comprising:
    a first lens group having positive refracting power; and
    a second lens group having negative refracting power, with the first and second lens groups arranged sequentially from an object side,
    wherein the first lens group includes the diffractive optical element according to claim 1, and
    a condition below is satisfied $0.001<f1/fpf<0.030$ where
    f1: Focal length of the first lens group, and
    fpf: Focal length of the diffractive optical element.

11. An optical apparatus comprising the optical system according to claim 9.

12. A method for producing a diffractive optical element including a diffraction grating so that the diffractive optical element serves as a lens, the method comprising forming the diffraction grating in such a way that a grating height of the diffraction grating in a central region around an optical axis is smaller than the grating height of the diffraction grating in a peripheral region, with the following conditions being satisfied:

$0.50 < rc < 0.98$; and $0.01\% < \Delta h/h0 < 10.00\%$, where r: Normalized radius (quotient resulting from operation of dividing height from optical axis in direction perpendicular to optical axis by effective diameter), h0: Average of the grating heights of the diffraction grating over a range of $0.00 < r < 0.50$, hmax: Average of the grating heights of the diffraction grating over a range of $0.98 < r < 1.00$, Δh: Difference between hmax and h0, and rc: Normalized radius at which the grating height is (h0+hmax)/2.

13. The diffractive optical element according to claim 1, wherein the grating height of the diffraction grating increases from the grating height of the diffraction grating in the central region around the optical axis to the grating height of the diffraction grating in the peripheral region.

* * * * *